(12) United States Patent
Beale et al.

(10) Patent No.: US 11,451,346 B2
(45) Date of Patent: Sep. 20, 2022

(54) COMMUNICATION DEVICE, INFRASTRUCTURE EQUIPMENT AND METHODS

(71) Applicant: Convida Wireless, LLC, Wilmington, DE (US)

(72) Inventors: Martin Warwick Beale, Basingstoke (GB); Samuel Asangbeng Atungsiri, Basingstoke (GB); Shin Horng Wong, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 502 days.

(21) Appl. No.: 16/483,748

(22) PCT Filed: Jan. 29, 2018

(86) PCT No.: PCT/EP2018/052110
§ 371 (c)(1),
(2) Date: Aug. 6, 2019

(87) PCT Pub. No.: WO2018/141683
PCT Pub. Date: Aug. 9, 2018

(65) Prior Publication Data
US 2020/0028630 A1 Jan. 23, 2020

(30) Foreign Application Priority Data
Feb. 6, 2017 (EP) ..................................... 17154893

(51) Int. Cl.
*H04L 1/18* (2006.01)
*H04L 1/20* (2006.01)
(Continued)

(52) U.S. Cl.
CPC ............ *H04L 1/1858* (2013.01); *H04L 1/188* (2013.01); *H04L 1/1845* (2013.01); *H04L 1/206* (2013.01);
(Continued)

(58) Field of Classification Search
CPC ..... H04L 1/1858; H04L 1/1845; H04L 1/188; H04L 1/206; H04L 25/0212; H04L 25/03159; H04L 1/1867; H04L 1/1867
(Continued)

(56) References Cited

U.S. PATENT DOCUMENTS

| 8,719,654 B2 * | 5/2014 | Kotecha | ............... H04B 7/0413 714/748 |
| 2008/0198786 A1 * | 8/2008 | Nieto | .................... H04L 1/1867 370/315 |

(Continued)

FOREIGN PATENT DOCUMENTS

| EP | 2077646 A1 | 7/2009 |
| WO | 2018/127421 A1 | 7/2018 |

OTHER PUBLICATIONS

International Search Report and Written Opinion dated Apr. 20, 2018 for PCT/EP2018/052110 filed on Jan. 29, 2018, 13 pages.
(Continued)

*Primary Examiner* — Kyle Vallecillo
*Assistant Examiner* — Enam Ahmed
(74) *Attorney, Agent, or Firm* — BakerHostetler

(57) ABSTRACT

A communications device configured to receive data transmitted as encoded data packets from an infrastructure equipment of a wireless communications network. Each of the encoded data packets are transmitted as a control signal component and a data signal component. The control signal component carries control information for detecting and decoding the data signal component in which the encoded
(Continued)

data carried by the encoded data packet is transmitted. As part of the ARQ-type protocol, at least the control signal component may be re-transmitted. By including with the control information carried by the retransmitted control signals an indication of at least a temporal location of the data signal component, which has already been transmitted and received in a buffer of a receiver, an improvement in a use of communications resource can be provided and also in some embodiments an improvement in a likelihood of correctly detecting and decoding an encoded data packet.

12 Claims, 15 Drawing Sheets

(51) Int. Cl.
H04L 25/02 (2006.01)
H04L 25/03 (2006.01)
(52) U.S. Cl.
CPC .... *H04L 25/0212* (2013.01); *H04L 25/03159* (2013.01)
(58) Field of Classification Search
USPC ........................................................ 714/749
See application file for complete search history.

(56) References Cited

U.S. PATENT DOCUMENTS

| | | | | |
|---|---|---|---|---|
| 2009/0125778 | A1* | 5/2009 | Uchida | H04L 1/0057 714/751 |
| 2010/0146354 | A1* | 6/2010 | Zhang | H04L 1/0029 709/224 |
| 2011/0283157 | A1* | 11/2011 | Yang | H04L 1/1607 714/749 |
| 2014/0185534 | A1 | 7/2014 | Vos et al. | |
| 2015/0270931 | A1 | 9/2015 | Sun et al. | |
| 2018/0139779 | A1* | 5/2018 | Kim | H04L 1/18 |
| 2020/0037353 | A1* | 1/2020 | Lee | H04L 1/00 |

OTHER PUBLICATIONS

ETSI, "Digital Video Broadcasting (DVB); Frame structure channel coding and modulation for a second generation digital terrestrial television broadcasting system (DVB-T2)", Final draft ETSI EN 302 755 V1.3.1, Nov. 2011, pp. 1-189.
Longoni et al., "Radio Access Network Architecture", WCDMA for UMTS—HSPA Evolution and LTE, Fourth Edition, 2007, pp. 67-90.
NTT Docomo, "New SID Proposal: Study on New Radio Access Technology", 3GPP TSG RAN Meeting No. 71 RP-160671, Göteborg, Sweden, Mar. 7-10, 2016, 8 pages.

* cited by examiner

PDSCH carrying URLLC payload is scheduled using a DCI transmitted on PDCCH

URLLC latency when HARQ re-transmissions are applied back-indication of PDSCH based on DTX of PUCCH relating to PDSCH feedback

COMMUNICATION DEVICE, INFRASTRUCTURE EQUIPMENT AND METHODS

CROSS-REFERENCE TO RELATED APPLICATIONS

The present application is based on PCT filing PCT/EP2018/052110, filed Jan. 29, 2018, which claims priority to EP 17154893.6, filed Feb. 6, 2017, the entire contents of each are incorporated herein by reference.

TECHNICAL FIELD OF THE DISCLOSURE

The present disclosure relates to communications devices configured to transmit data to a wireless communications network and to receive data from the wireless communications network via a wireless access interface using a transmitter and a receiver respectively, which include an arrangement for providing a feedback message such as an ACK or NACK which may be part of an automatic repeat request (ARQ) type protocol. The present invention also relates to methods of communicating using communications devices, wireless communications networks, infrastructure equipment and methods.

The present application claims the Paris Convention priority of European patent application EP17154893, the contents of which are hereby incorporated by reference.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication (MTC) devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficient connectivity for a wide range of devices associated with different applications with different characteristic data traffic profiles, resulting in different devices having different operating characteristics and/or requirements.

One example of such a new service is referred to as Ultra Reliable Low Latency Communications (URLLC) services, which as its name suggests requires that a data unit or packet be communicated with a high reliability with a low communications delay. URLLC type services therefore represent a challenging example for both LTE type communications systems and 5G/NR communications systems.

SUMMARY OF THE DISCLOSURE

Embodiments of the present technique can provide an improvement to services which utilise feedback from a receiver to a transmitter to indicate whether a data packet has been determined to have been received correctly or not. Such an arrangement may be in accordance with an ARQ-type protocol of which there are several examples.

Embodiments of the present technique transmit encoded data packets with a control signal component and a data signal component. The control signal component carries control information for detecting and decoding the data signal component in which the encoded data carried by the encoded data packet is transmitted. As part of the ARQ-type protocol, at least the control signal component may be re-transmitted. By including with the control information carried by the retransmitted control signals an indication of at least a temporal location of the data signal component, which has already been transmitted and received in a buffer of a receiver, an improvement in a use of communications resource can be provided and also in some embodiments an improvement in a likelihood of correctly detecting and decoding an encoded data packet. For example if the control signal component in the first transmission was not received, then the retransmission of the control signal component can direct the receiver to the data signal component, which has already been transmitted and stored in the buffer without a requirement to retransmit the data signal component of the encoded data packet, thereby making more efficient use of the communications resources of the wireless access interface.

Various further aspects and embodiments of the disclosure are provided in the appended claims, including but not limited to, a transmitter, a receiver, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Embodiments of the present technique find application with wireless communications systems which provide a wireless access interface which utilises feedback between a receiver and a transmitter relating to a status of transmission of a data packet or data unit, which may be communicated according to an automatic repeat request (ARQ) type protocol. As an illustration, example embodiments will be explained with reference to a wireless communications network, which utilises a wireless access interface according to an LTE standard. However embodiments of the present technique are not limited to LTE and have been developed in part for application with a new radio access technology or new radio (NR), which is also known as 5G. In other embodiments, a transmitter or a receiver may form part of a communications device or an infrastructure equipment such as an eNodeB (eNB) or configured in accordance with an LTE standard or a gNodeB (gNB) configured in accordance with a 5G standard.

Figure 1:
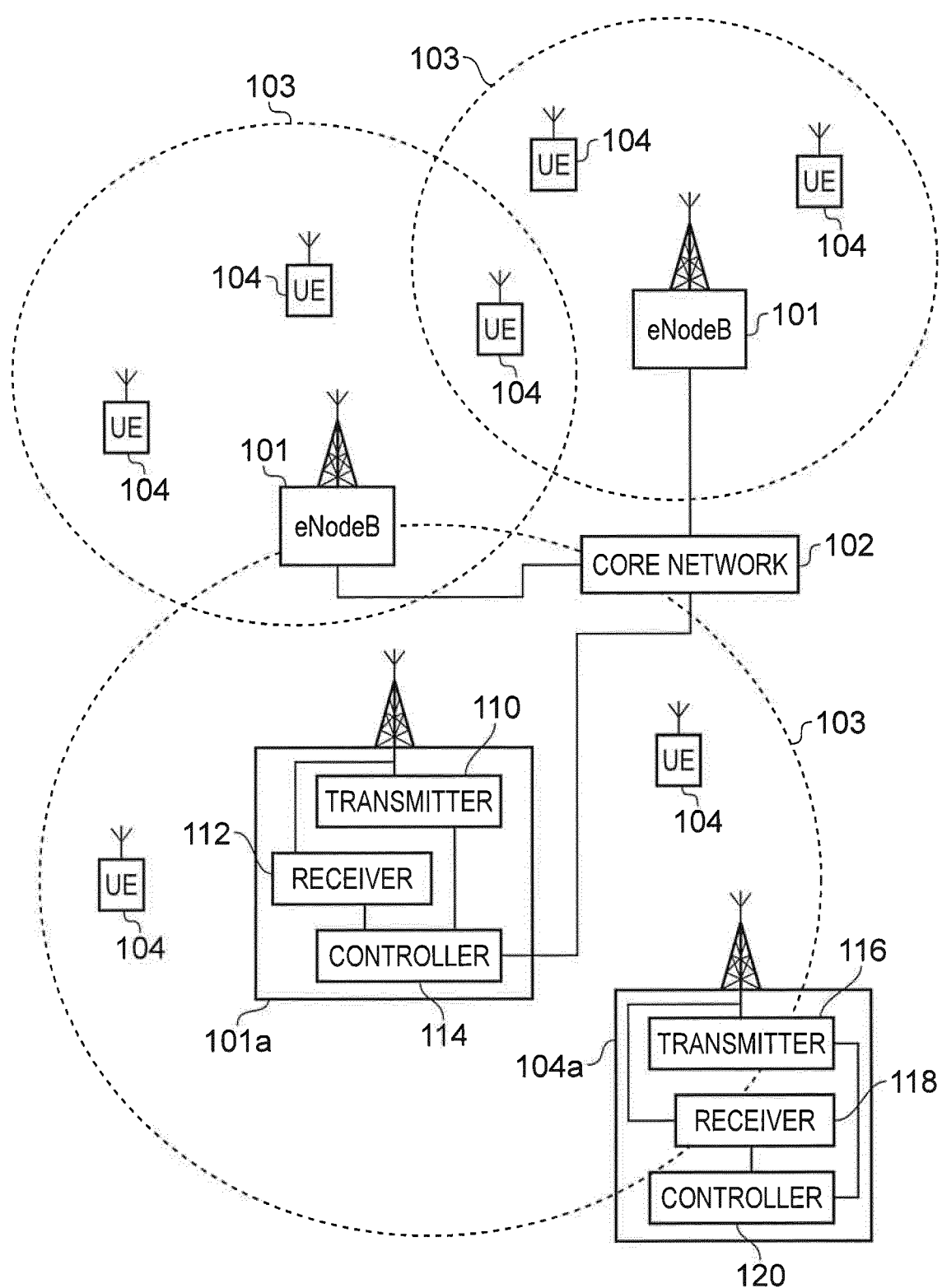
FIG. 1 provides a schematic diagram illustrating an example of a conventional mobile communications system.

As an example, FIG. 1 provides a schematic diagram illustrating some basic functionality of a mobile telecommunications network/system operating in accordance with LTE principles. Various elements of FIG. 1 and their respective modes of operation are defined in the relevant standards administered by the 3GPP® body, and also described in many books on the subject, for example, Holma H. and Toskala A [1] ISBN 9780470-319338 Fourth edition, 2007 Chapter 5. It will be appreciated that operational aspects of the telecommunications network which are not specifically described below may be implemented in accordance with any known techniques, for example according to the relevant standards.

FIG. 1 includes infrastructure equipment comprising base stations 101 which are connected to a core network 102, which operate in accordance with a conventional arrangement which will be understood by those acquainted with communications technology. The infrastructure equipment 101 may also be referred to as a base station, network element, or as explained above, an enhanced NodeB (eNodeB (eNB)), 5G Node B (gNB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. The transmitter and the receiver may include radio frequency processing circuitry, base band signal processing circuits and as will be explained shortly error correction encoder and decoders and modulators and demodulators. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and a downlink by managing the communications resources of the wireless access interface. The controller 114 may therefore be implemented as a hardware processor configured in accordance with a predetermined specification or a software controlled processor.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. A controller circuit 120 controls the transmitter 116 and the receiver 118, and similar to the transmitter 110 and the receiver 112 in the eNodeB, the transmitter 116 and receiver 118 may be implemented as radio frequency circuits and signal processing hardware and circuitry, and the controller circuitry may be a hardware processor or software configured circuitry which controls the transmitter 116 and the receiver 118 in accordance with a predetermined specification.

As mentioned above, the embodiments of the present invention can also find application with advanced wireless communications systems such as those referred to as 5G or New Radio (NR) Access Technology. New Radio Access Technology (RAT) has been proposed in [3] to develop a new RAT for the next generation wireless communication system, i.e. 5G, and in 3GPP a Study Item (SI) on NR has been agreed [4] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

The elements of the wireless access network shown in FIG. 1 may be equally applied to a 5G new RAT configuration, except that in accordance with a change in terminology the base stations, which are an example of radio network infrastructure equipment, may also be referred to as transceiver stations/NodeBs/eNodeBs (eNBs)/gNodeBs (gNBs), and so forth. Similarly the communications devices may have a functionality corresponding to devices known for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
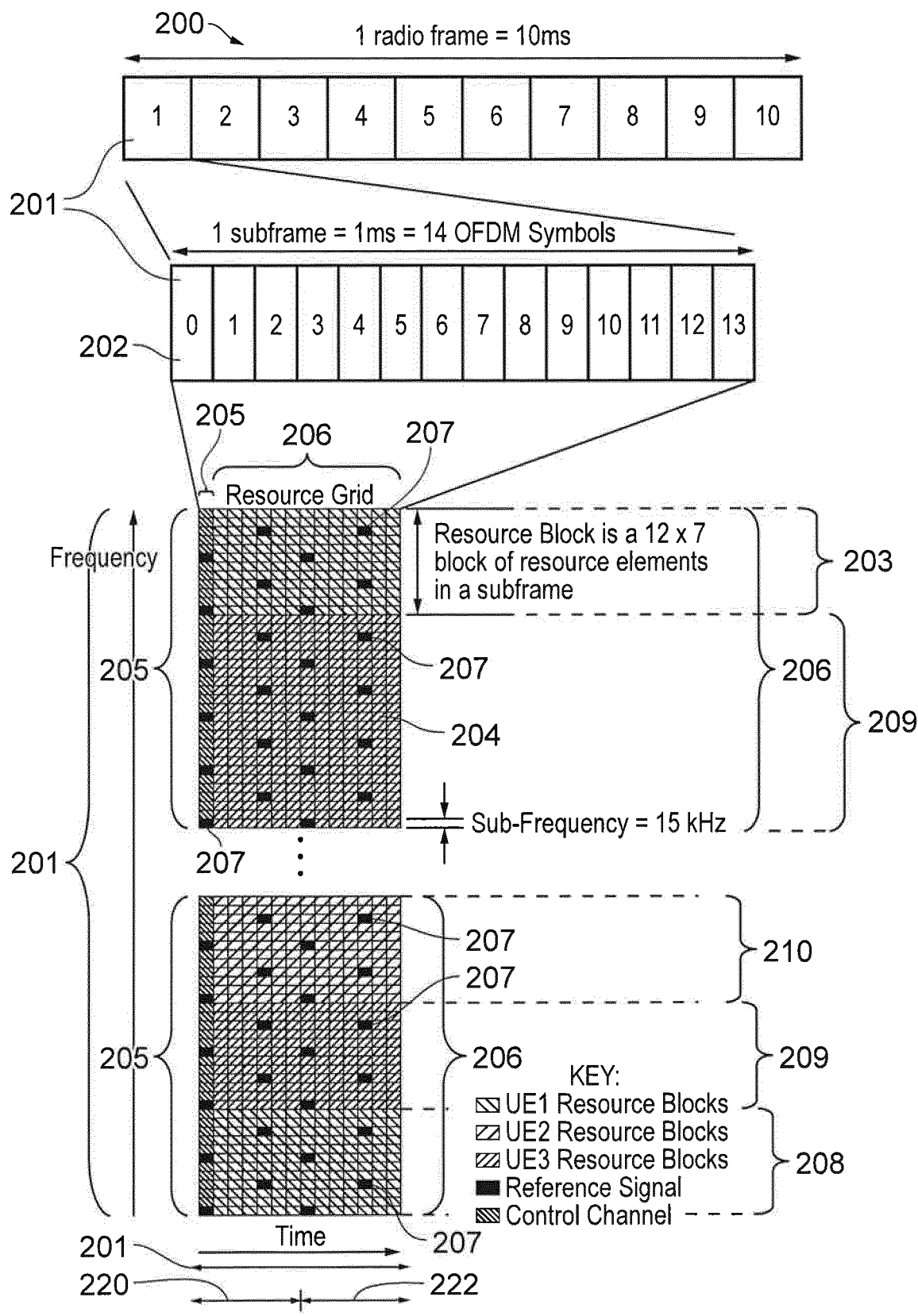
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each with a duration of 1 ms. Each sub-frame 201 is formed from 14 OFDM symbols and is divided into two slots 220, 222 each of which comprise six or seven OFDM symbols depending on whether a normal or extended cyclic prefix is being utilised within OFDM symbols for the reduction of inter symbol interference. The resources within a slot may be divided into resources blocks 203 each comprising 12 subcarriers for the duration of one slot and the resource blocks are further divided into resource elements 204 which span one subcarrier for one OFDM symbol, where each rectangle 204 represents a resource element. The resource elements distributed in time within a sub-frame and frequency across the host system bandwidth represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data and reference signals 207 which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 2, UE1 has been allocated resources 208 of the data region 206, UE2 resources 209 and UE3 resources 210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 3:
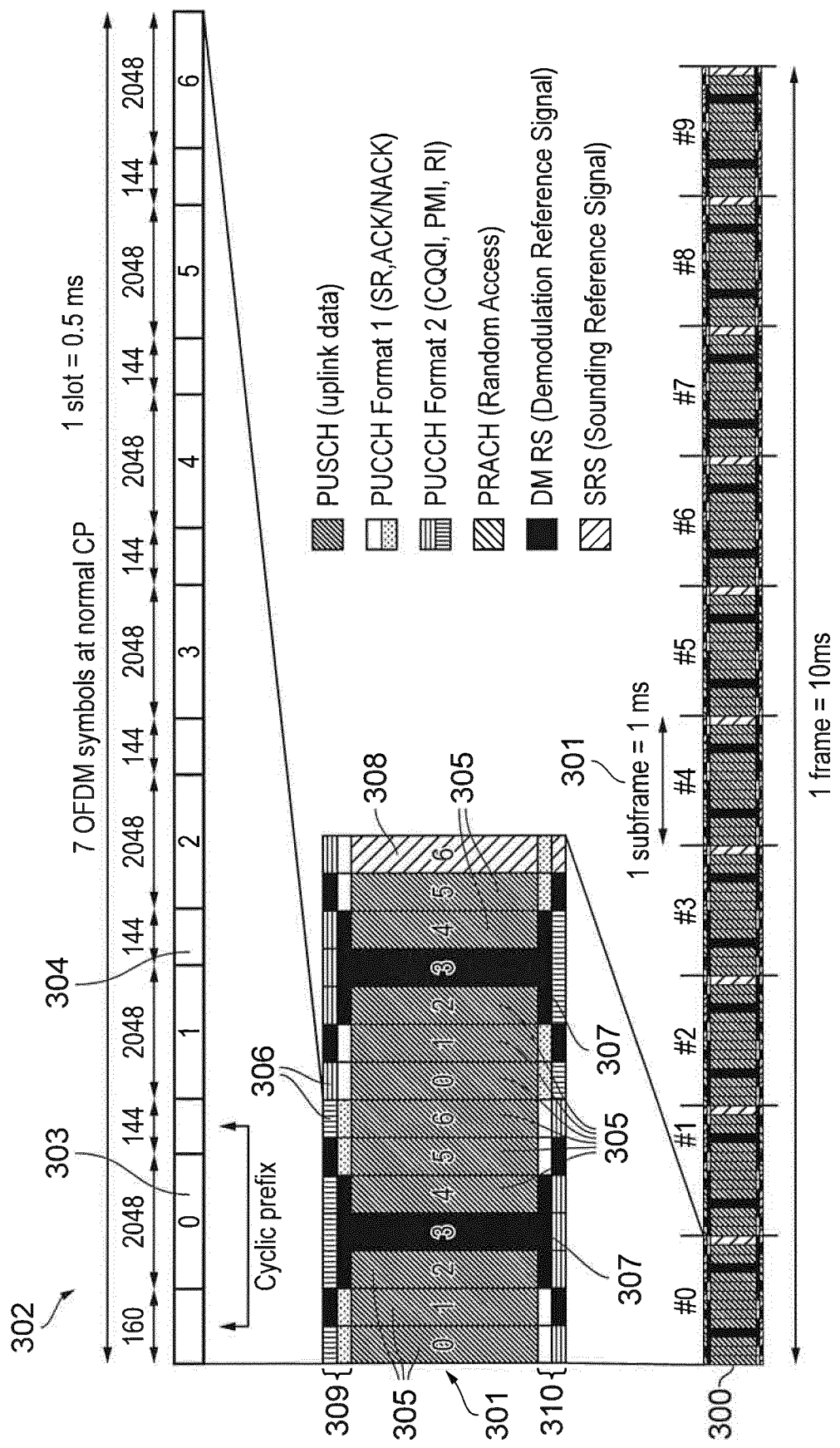
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 300 is divided into 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Physical Layer Transmission and Reception

Figure 4:
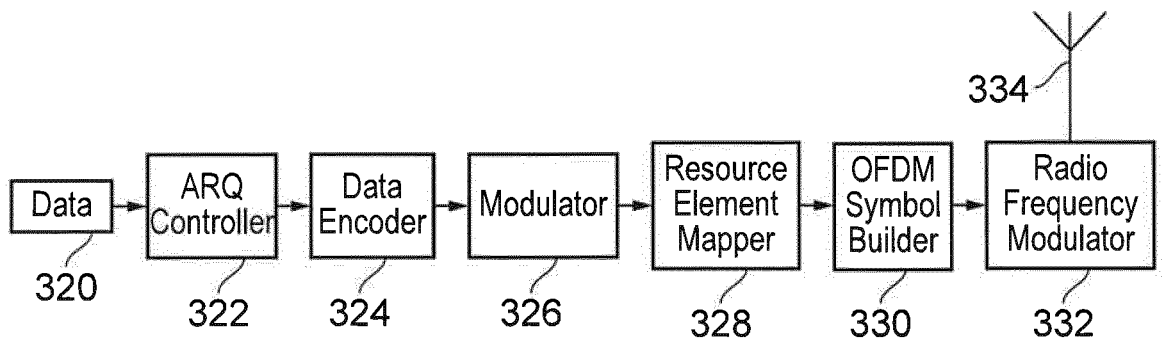
FIG. 4 is a schematic block diagram of an example of a transmitter which may form part of a communications device (UE) or a base station (eNodeB or gNB) of the wireless communications network shown in FIG. 1.
Figure 5:
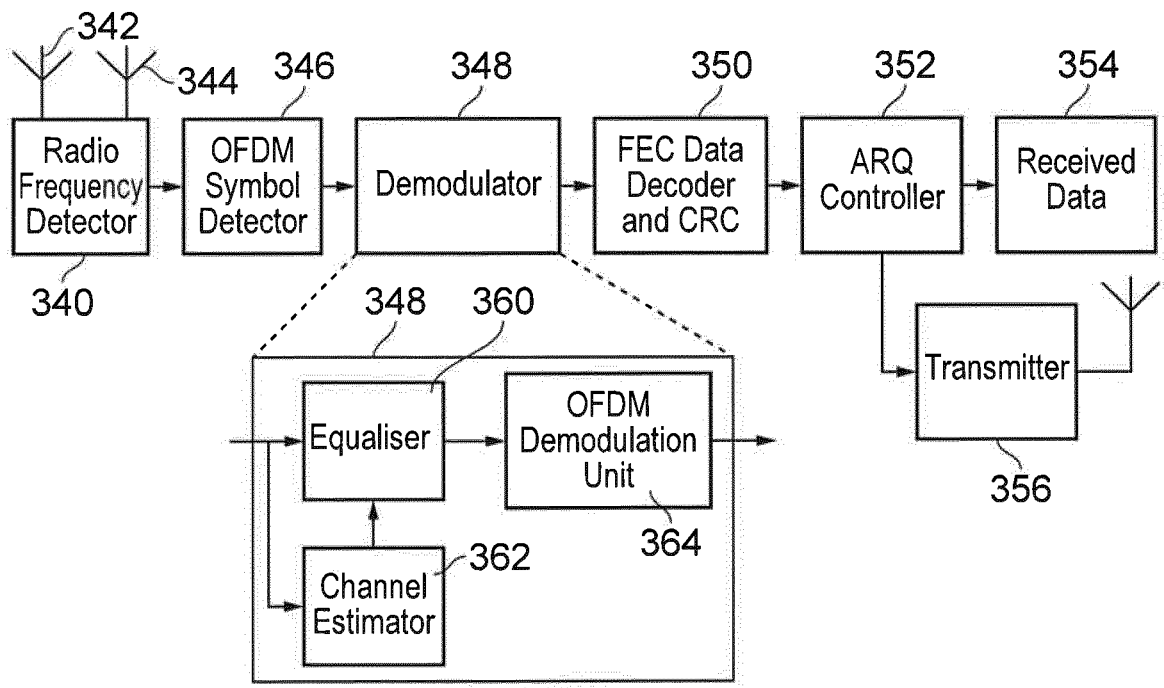
FIG. 5 is a schematic block diagram of an example of a receiver which may form part of a communications device (UE) or a base station (eNodeB or gNB) of the wireless communications network shown in FIG. 1.

Embodiments of the present technique can find application in a transmitter and receiver which employs an OFDM-based waveform to transmit and receive data. Examples of OFDM-based waveforms include the LTE downlink and the LTE uplink, where the LTE uplink uses a Discrete Fourier Transform spread OFDM (DFT-S-OFDM) waveform. The LTE uplink hence implements an OFDM-based Single Carrier Frequency Division Multiple Access scheme (SC-FDMA). References to "OFDM" in the current description hence also apply to an SC-FDMA based waveform, as will be understood by a skilled artisan. As such, embodiments of the present technique can find application in a UE and an eNB of a wireless communications system, which may conform to an NR/5G standard or an LTE standard. An arrangement of signal processing blocks, which may be implemented as integrated circuits or processing units, which may be used to form part of physical layer processing in transmitters 110, 116 and receivers 112, 118 of a wireless communication system such as that of FIG. 1 are illustrated in FIGS. 4 and 5. FIGS. 4 and 5 will now be described in order to gain a better appreciation of the embodiments described in the following paragraphs.

As shown in FIG. 4 a data source 320 feeds data to be transmitted via the wireless access interface in for example the eNB or gNB to an automatic repeat request (ARQ) controller 322. The ARQ controller 322 forms the data from the data source 320 into data units for transmission in one or more subframes of the wireless access interface. The ARQ controller 322 may operate to control transmission of data in accordance with various types of ARQ processes known to those skilled in the art. Such techniques typically involve forming the data to be transmitted into data units, transport blocks or data packets for transmission. The ARQ controller 322 may operate in combination with a data encoder 324 to encode data packets to determine whether they have been correctly received and to improve the likelihood that the data packets are received correctly. In accordance with an ARQ protocol performed by the ARQ controller 322, a receiver may transmit a feedback signal representing either acknowledgement ACK, or a negative acknowledgment NACK in dependence upon whether a data packet has been successfully received or not received successfully. In response to detecting an NACK or not detecting an ACK, the ARQ controller 322 may respond by retransmitting the data unit which was not received correctly. In some examples, the ARQ controller may transmit increasing amounts of redundant data generated by the data encoder 324 in response to an indication that a data packet cannot be decoded. However there are many variations on ARQ protocols and the present technique is not limited to a particular protocol.

The data encoder 324 receives each data unit and performs encoding and scrambling to improve the integrity of the transmitted data and to provide some rejection of co-channel interference. The encoded data is then received at a modulator 326, which maps the data onto modulation symbols and performs other processing tasks to convert the modulation symbols into modulation cells. The modulation cells generated by the modulator 326 are then received by a resource element mapper 328 which maps the modulation cells onto the subcarriers of OFDM symbols which in combination with the OFDM symbol builder 328 generates OFDM symbols. The OFDM symbols are then used to modulate a radio frequency carrier for transmission by an RF modulator 332 from the antenna 334.

As shown in FIG. 5 at the receiver a radio frequency detector may detect the transmitted signal (from the base station or UE as appropriate) using a radio frequency detector 340. The radio frequency detector 340 may in some configurations include a plurality of antennas 342, 344 which may provide a multiple input multiple output (MIMO) or single input, multiple output diversity scheme. An OFDM symbol detector 346 then receives a baseband version of the signal detected by the radio frequency detector and recovers the OFDM symbols. The OFDM symbol detector includes a forward Fast Fourier Transform (FFT) which transforms the time domain signal into the frequency domain. The OFDM symbols are then fed to a demodulator 348, which demodulates the subcarriers to generate for each sub-carrier a received modulation cell, which is then mapped back into the data symbols to reverse operations performed by the modulator. The received data is then fed to the data decoder 350 which performs error correction decoding, descrambling and error detection decoding (for example using a CRC check, which is used to generate the ACK/NACK) to reverse the operations performed at the transmitter by the data encoder 324 in order to improve the integrity of the received data and co-operates with an ARQ controller 352 in the receiver to determine whether data packets transmitted by the transmitter can be correctly received. The ARQ controller 352 therefore generates the ACK/NACK responses for transmission to the transmitter, using a receiver-transmitter 356 included in the entity with the receiver of FIG. 5 to organise the re-transmissions as appropriate. The ARQ controller 352 then reassembles the data units into the data as presented by for example a higher layer application which is forwarded to a data sink 354.

As shown in FIG. 5 the demodulator 348 includes an equaliser 346, a channel estimator 362 and an OFDM demodulation unit 364. The channel estimator 362 receives the detected OFDM symbol from the OFDM symbol detector 346 and generates an estimate of an impulse response of the channel through which the received OFDM symbol has passed. The impulse response may be generated in the frequency domain as a set of estimated phase and amplitude distortions across the frequency domain. To this end, according to a conventional arrangement, the received OFDM symbol includes reference symbols which transmit known symbols which when correlated with a reproduction of those symbols are used to generate an estimate of the impulse response of the channel. The channel estimate is therefore fed to the equaliser 360, which compensates for the distortions caused by the channel, from the received modulation symbols. The OFDM demodulation unit then demodulates the OFDM symbol to provide log-likelihood ratios (LLRs) on the bits associated with the modulations symbols. The LLRs are an example of soft decision bits. As will be appreciated there are other ways of performing equalisation of the received signal which can be done in the frequency domain or the time domain and therefore the equaliser 360 may form part of the OFDM demodulation unit 364. However the architecture showing in FIG. 5 has been provided in order to illustrate an example embodiment to the present technique which will be explained shortly.

The example transmitter and receiver shown in FIGS. 4 and 5 are configured to transmit data using an ARQ process according to a conventional arrangement of a transmitter and receiver chain. Embodiments of the present technique can find application with URLLC devices, such as those which find application with LTE or 5G new radio (NR).

Embodiments of the present technique provide an improvement to communications services, which deliver data with a relatively high reliability and with a relatively low latency. Such communications services present a significant challenge when communicating via wireless access interfaces in which the radio communications conditions vary and the communications device transmitting or receiving the data may be mobile. In one example the communications may provide an ultra reliable low latency communications (URLLC) service, such as that being proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of OFDM symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

Figure 6:
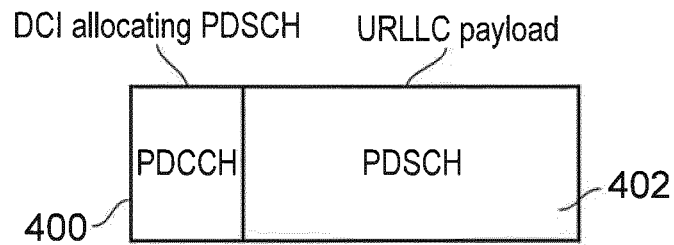
FIG. 6 is a schematic representation of a packet transmission according to an Ultra Reliable Low Latency Communications (URLLC) service using a PDCCH channel and a PDSCH channel forming part of the downlink of the wireless access interface according to an LTE standard.
Figure 7:
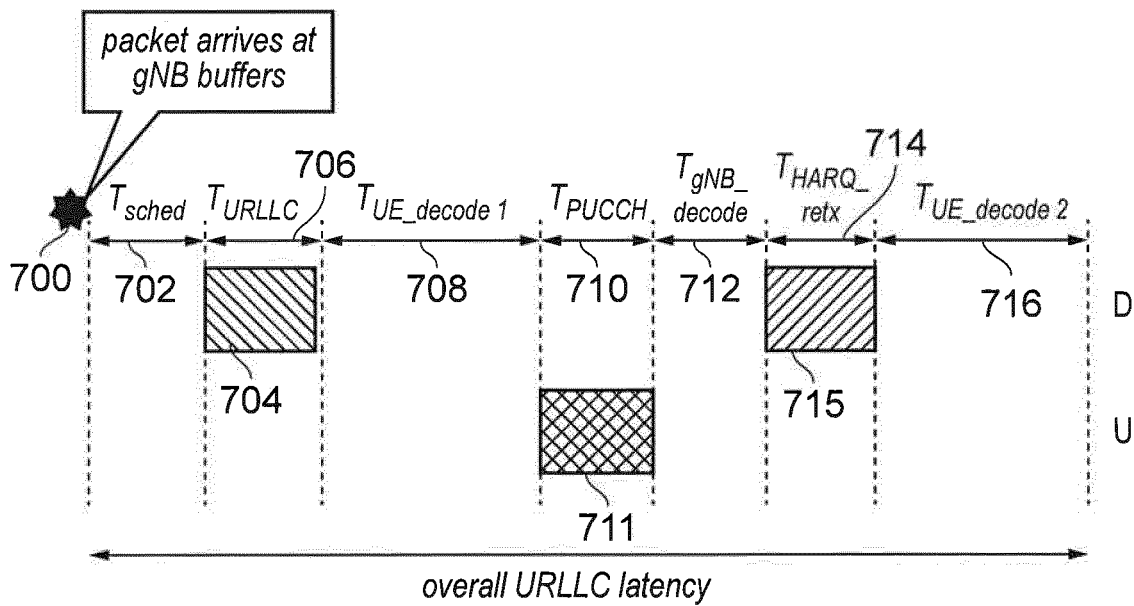
FIG. 7 is a part schematic block diagram, part flow diagram illustrating a time duration of various processes required to transmit a URLLC packet shown in FIG. 6.

As shown in FIG. 6, a URLLC transmission may be scheduled using a downlink control indicator (DCI) in a physical downlink control channel (PDCCH), which is transmitted before the physical downlink shared channel (PDSCH) that carries the URLLC payload, as shown in FIG. 6. The URLLC transmission is shown in FIG. 6 to be comprised principally of two parts, a control signal transmitted in a section comprising the PDCCH 400 carrying the DCI and a data signal transmitted in a section comprising the PDSCH 402 carrying the URLLC payload. FIG. 7 shows how the overall URLLC latency is composed of various factors, which are introduced by each step of a process in the transmission of a data unit using an ARQ process. As shown in FIG. 7 a transmission from a base station to a communications device for example, such as for example an eNB or gNB to the UE, comprises different stages, each of which requires a certain processing time. The time durations shown in FIG. 7 are not necessarily to scale. The total latency of the HARQ operation is dependent on the following factors:

Initially, a packet arrives at the gNB buffers 700.

$T_{sched}$. The gNB schedules the packet to be transmitted at the next possible opportunity, e.g. at the next mini-slot boundary, which is represented as $T_{sched}$ 702.

$T_{URLLC}$. The URLLC packet 704 is transmitted over the air, which is represented as $T_{URLLC}$ 706. The duration of transmission is a mini-slot and for these purposes, assumed to include the propagation time it takes to arrive at the antenna of the receiver.

$T_{UE\_decode1}$. The URLLC packet is decoded in a time $T_{UE\_decode1}$ 708, which includes the processes of channel estimation, FEC decoding and CRC decoding.

$T_{PUCCH}$. An ACK/NACK is transmitted 711 in accordance with the ARQ process on the PUCCH physical channel, as represented by a time $T_{PUCCH}$ 710. The PUCCH may be timing advanced, which can be considered to be taken into account in the time $T_{PUCCH}$. The propagation time can also be considered to be taken into account in the time $T_{PUCCH}$. In the example of FIG. 7, a NACK is transmitted by the UE.

$T_{gNB\_decode}$. The gNB decodes the PUCCH, which is represented in FIG. 7 as time $T_{gNB\_decode}$ 712 and schedules a HARQ re-transmission 715 of the URLLC packet, as represented by a time $T_{HARQ\_retx}$ 714.

$T_{UE\_decode2}$. According to the ARQ protocol, the HARQ re-transmission is combined with the initial transmission and is decoded by the UE, as represented by a decoding time $T_{UE\_decode2}$ 716.

The time between transmission of packet 704 and the re-transmission of that packet 715 in a HARQ protocol is termed the HARQ round trip time (RTT). The HARQ RTT is dependent on the latencies discussed above.

Having regard to the above time periods, relative to the overall URLLC latency, the time duration $T_{UE\_decode1}$ can be substantial. As such, a technical problem can be to reduce the HARQ round trip time in order to reduce the overall URLLC latency.

Embodiments of the present technique can provide an arrangement which can reduce resource wastage when URLLC is transmitted with multiple retransmissions of the URLLC packet associated with an automatic repeat request-type protocol.

Early Indication/Running Feedback on Reception Status

As disclosed in our co-pending European patent application P111263EP the contents of which are incorporated herein by reference an arrangement can be provided of a receiver to provide an earlier feedback of whether or not a data packet has been received, which reduces a time of transmission of a URLLC packet. The reduction of time and resources used can be achieved by triggering an early HARQ re-transmission of that packet. This is achieved by running feedback on the reception status of the URLLC packet giving an early indication of the reception status of an URLLC packet, which can therefore be used to at least prepare for a re-transmission of the URLLC packet, even if this is subsequently not needed. For example, this early indication can be provided by the UE to the gNB.

Figure 8:
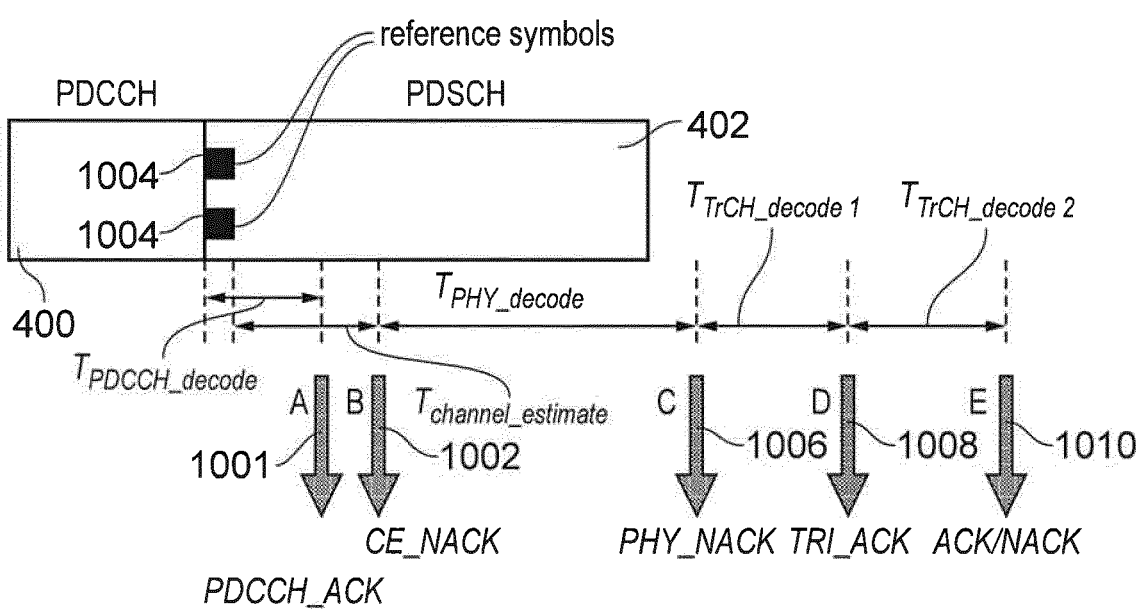
FIG. 8 is a part schematic block diagram, part flow diagram illustrating transmission of a URLLC packet of FIGS. 6 and 10 with a sequence of events associated with the transmission with corresponding time durations of processes involved in transmitting the packet.

An example illustration of an arrangement in which a receiver provides an early feedback indication, FIG. 8, provides an illustration of various points in the receive in which early feedback can be provided as part of a running feedback process. FIG. 8 is explained as follows:

Event A 1001: After PDCCH transmission, the PDCCH is decoded as explained with reference to FIG. 9. If the UE receives the PDCCH, it transmits a "PDCCH_ACK" signal to the gNB as represented by event A 1001. If the gNB does not receive the PDCCH_ACK, it knows that the UE did not receive the PDCCH and will hence re-schedule the URLLC packet in advance of the time at which it would expect an ACK/NACK indication based on CRC decoding of the URLLC packet (i.e. in advance of 1010).

Event B 1002: The UE uses reference symbols 1004 at the start of the PDSCH transmission to derive a channel estimate as explained above for the example receiver of FIG. 5. As explained above, as part of the channel estimate derivation, the UE may determine an SNR estimate. The UE determines whether the channel estimate and/or SNR estimate are of sufficient quality to decode the MCS (modulation and coding scheme) that was signalled for PDSCH in the PDCCH. If these values are deemed to be insufficient, the UE transmits a "CE_NACK" as part of event 1002 to the gNB. If the gNB receives a CE_NACK as part of this event 1002, it will re-schedule the URLLC packet before the remaining receiver operations are applied to decode the URLLC packet. It should be noted that a CE_NACK is not the same as a NACK of the HARQ packet. The CE_NACK is just an indication that the channel estimate is estimated to be of insufficient quality to decode the HARQ packet. However, the UE may still eventually be able to decode the HARQ packet.

Event C 1006: The UE performs some physical decoding of the URLLC packet. Physical decoding includes generation of LLRs based on demodulation of detected resource elements. If the quality of the LLRs is deemed to be insufficient, the UE sends a "PHY_NACK" as part of event 1006 to provide an early indication at the physical channel processing stage that the reception of the PDSCH is likely to fail. If the gNB receives a PHY_NACK as part of this event 1006, it will re-schedule the URLLC packet before the remaining receiver operations are applied to decode the URLLC packet.

Event D 1008: During initial stages of transport channel processing, an estimate of the decodability of the URLLC packet can be made using metrics generated as part of the forward error correction (FEC) decoding. For example, when the URLLC packet uses Turbo coding FEC, if the Turbo decoding leads to a correct CRC result after a few iterations, the UE can transmit an early indication that the URLLC packet has been decoded by sending a "TR1_ACK" signal as part of this event 1008 to the gNB. When the URLLC packet uses low density parity check (LDPC) FEC, if the extrinsic information checks between decoding iterations start showing a flat response at low average value, this could be an indication that the probability of correct decoding will be low. The UE can send a "TR1_NACK" signal as part of this event 1008 to the gNB in this instance.

Event E 1010: After completion of decoding of the URLLC packet an ACK/NACK is transmitted by the ARQ controller 352 in accordance with a conventional operation.

Embodiments of the present technique can provide an arrangement in which a UE is scheduled with PDSCH resources, where the PDSCH resources are indicated to the UE using a PDCCH channel and the UE transmits an acknowledgement of reception of the PDCCH to the gNB. If the gNB does not receive the acknowledgement of this PDCCH, it re-schedules transmission of the PDCCH, the PDSCH or both the PDCCH and PDSCH to the UE. Hence the process explained above with reference to FIGS. 7 and 8, is as also shown in FIG. 9 with respect to actions performed at the UE and the base station (gNB).

Figure 9:
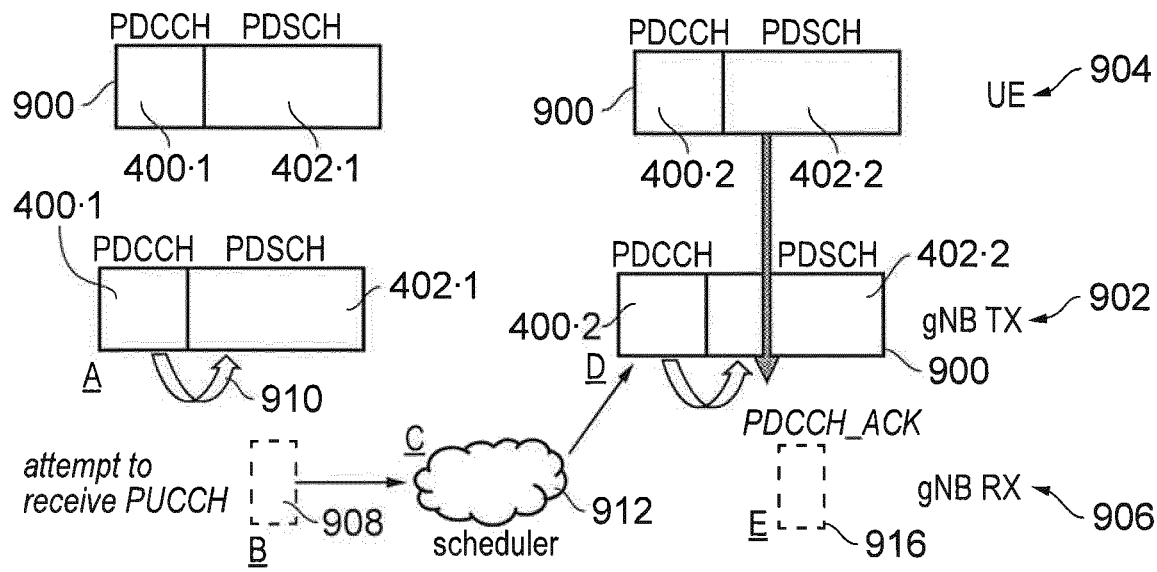
FIG. 9 is a part schematic block diagram, part flow diagram illustrating a process of transmitting a URLLC packet of FIG. 6 representing an encoded data packet using repeated transmission according to an automatic repeat request process.

FIG. 9 provides an example of re-transmission based on a non-reception of the PDCCH_ACK according to our co-pending European patent application P111263EP. As shown in FIG. 9 two encoded data packets 900, corresponding to those shown in FIG. 6 are successively transmitted from a gNB as shown in a first line 902 and received at a UE as represented in a second line 904. According to a status of the decoding of the control channel, the UE may be configured to provide an indication that the control information transmitted in the control signals section 400.1 of the encoded data packet has been successfully received. In the example of LTE, the UE may be unaware of whether it is being scheduled with a control channel and hence only indicates if the control signals section of the encoded data packet has been successfully received. In other communication systems, the UE may know that it is being scheduled and hence additionally send an indication that the control signals section has not been successfully received. As represented by an arrow 910 the control information provides the UE with an indication of how to decode the encoded data packet transmitted in the shared resources 402. According to the example shown in FIG. 9, as represented by a third horizontal section 906, the gNB attempts to receive an indication in the PUCCH that the control information in the PDCCH has been received as represented by a dashed box representing a time window where the gNB is expecting to detect an ACK of the PDCCH 908. Thus, during a known time window 908, the gNB attempts to decode a PDCCH_ACK that the UE should have transmitted if it had received the PDCCH. In the example shown in FIG. 9, the gNB did not receive a PDCCH_ACK, and hence the scheduler 912 schedules a re-transmission of the PDSCH as represented by an arrow 914. The gNB then re-transmits the PDSCH 402.2. This re-transmission is indicated with a new PDCCH 400.2, indicating the resources used by the PDSCH re-transmission 402.2. The gNB receives a PDCCH_ACK within a window 916, acknowledging that the UE has received the PDCCH.

The re-transmission scheme shown in FIG. 9 provides an early indication that the UE is unable to receive the URLLC transmission (via the PDCCH_ACK mechanism), hence reducing latency. However the first transmission of the PDSCH cannot be received by the UE and this is wasteful of air interface resources. The object of the current invention is hence to make better use of air interface resources, increase the robustness and reliability of URLLC transmissions and to decrease the latency of URLLC when there are re-transmissions.

Figure 10:
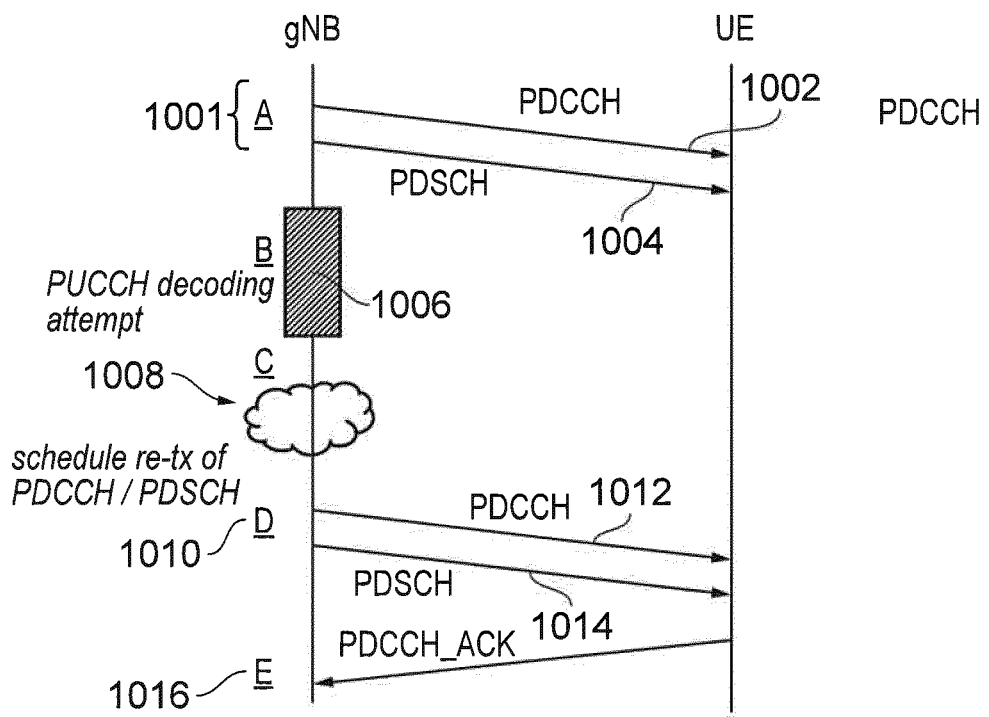
FIG. 10 is a message flow diagram illustrating a process flow of transmitting a URLLC packet of FIG. 6 representing an encoded data packet according to the automatic repeat request process of FIG. 9.

FIG. 10 provides a message flow diagram representing the timing and steps corresponding to the example shown in FIG. 9. A first transmission of the encoded data packet occurs as a first step 1001 and comprises a PDCCH section 1002 and a PDSCH section 1004. The gNB then attempts to decode the PUCCH 1006 indicating whether the UE has received the PDCCH or not (i.e. during 1006, the gNB attempts to decode a PDCCH_ACK). If the UE is unable to decode the PDCCH, and therefore does not transmit a PDCCH_ACK to the gNB, the gNB will not be able to detect a PDCCH-ACK from the UE at the PUCCH decoding attempt 1006. Accordingly at step 1008 the scheduler 912 schedules a retransmission of the encoded data packet 1010 which again comprises the PDCCH 1012 and the PDSCH 1014. When the UE can detect the PDCCH, it transmits a PDCCH_ACK to the gNB 1016.

Figure 11:
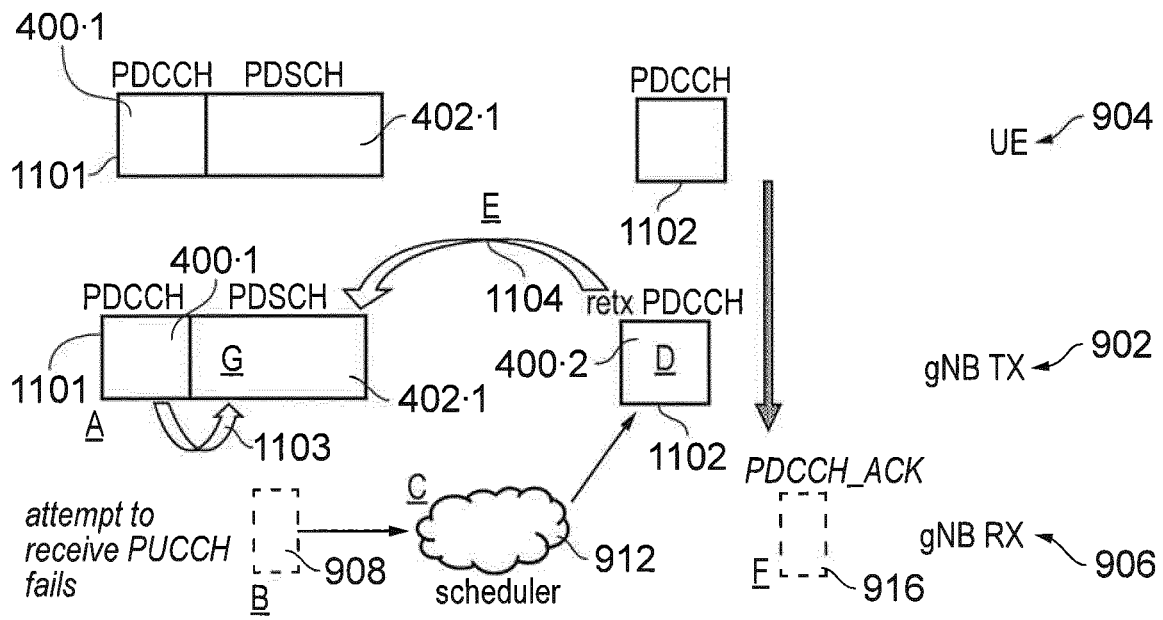
FIG. 11 is a part schematic block diagram, part flow diagram illustrating a process of transmitting a URLLC packet corresponding to the example shown in FIG. 9, but adapted in accordance with the present technique in which a retransmitted control signal of an encoded data packet identifies a previously transmitted data signal component of the encoded data packet stored in a buffer of a receiver in the communications device.

First Example Embodiments: Back Indication of
PDSCH Resources by Re-Transmitted PDCCH Embodiments of the present technique can provide an arrangement in which a re-transmitted PDCCH indicates PDSCH resources that were previously transmitted (i.e. the PDCCH provides a "back-indication" of PDSCH resources). FIG. 11 provides an example illustration of an embodiment of the present technique, in which corresponding parts shown in FIG. 9 have the same numerical designations. FIG. 11 is summarised as follows:

The gNB makes a first transmission 1101 of an encoded data packet PDCCH 400.1 and PDSCH 402.1 to the UE, in which the control information provided in the PDCCH 400.1 identifies the resources in which the PDSCH 402.1 are transmitted and information for decoding the encoded data packet carried in the PDSCH as identified by an arrow 1103.

As in FIG. 9, during a known time window 908, the gNB attempts to decode a PDCCH_ACK that the UE should have transmitted if it had received the PDCCH.

In this example, the UE did not decode the PDCCH 400.1 and hence does not transmit a PDCCH_ACK in response to PDCCH 400.1 Since the gNB did not receive a PDCCH_ACK, the scheduler 912 schedules a re-transmission of the PDCCH 1102, where the PDCCH provides an indication 1104 (back-indication) of the PDSCH that was previously transmitted.

The gNB re-transmits the PDCCH 1102. This re-transmitted PDCCH 1102 provides an indication (back-indication 1104) of the previously transmitted PDSCH 402.1.

The UE decodes the re-transmitted PDCCH 1102. Based on the back-indication, the UE is able to start decoding the PDSCH 402.1. The UE hence transmits a PDCCH_ACK to the gNB.

The gNB receives the PDCCH_ACK 916, transmitted by the UE on the PUCCH on the up-link as represented by an arrow 1108 acknowledging that the UE has received the PDCCH 1102.

Hence the gNB transmits the PDSCH once and only re-transmits the PDCCH, since it was the PDCCH that was deemed to have not been received by the gNB.

According to the above example, the present technique has been described in terms of a situation where the gNB does not receive a PDCCH_ACK from the UE. Lack of PDCCH_ACK reception allows the gNB to determine that the UE did not receive the PDCCH 400.1. However the present technique can be applied in any situation where the gNB determines that the UE did not receive the original PDCCH. For example, the gNB can determine that the UE did not receive PDCCH based on not receiving a PUCCH related to the PDSCH, which is, in other words, based on the base station receiver indicating "discontinuous transmission (DTX)" of the ACK/NACK 1010 shown in FIG. 8. In an example base station receiver implementation, DTX is indicated by the receiver if the receiver believes that the UE did not transmit a signal.

Figure 12:
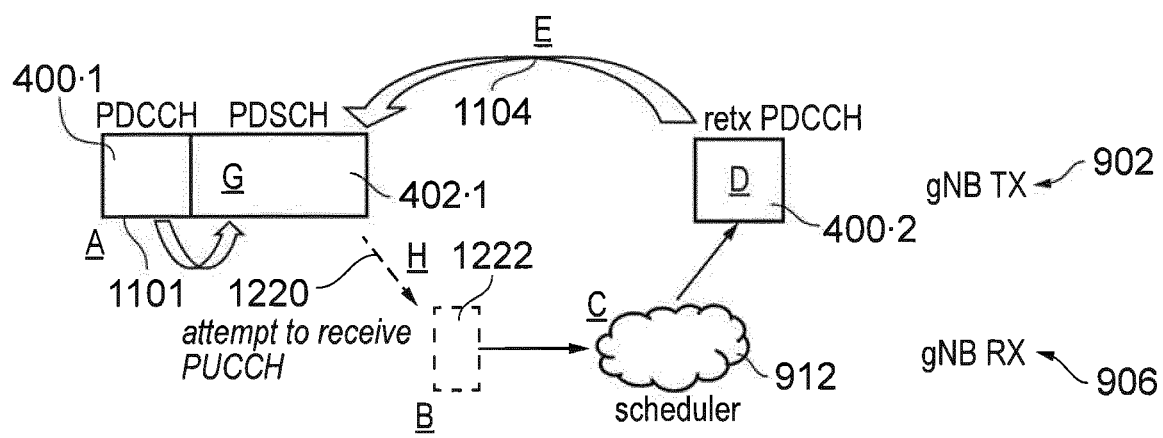
FIG. 12 is a part schematic block diagram, part flow diagram illustrating a process of transmitting a URLLC packet corresponding to the example shown in FIG. 11, but adapted in accordance with the present technique so that the control signal component provides a back-indication of the data signal component based on a discontinuous transmission response of a base station receiver to a hypothesized acknowledgement signal potentially transmitted by a communications device to the transmitter relating to the reception.

Scheduling a PDCCH with a back-indication based on the base station receiver determining "DTX" of the PUCCH that should have been transmitted by the UE if it had received a PDCCH allocating PDSCH is shown in FIG. 12. FIG. 12 shows that PDCCH 400.1 and PDSCH 402.1 are transmitted to the UE. If the UE had received the PDCCH 400.1, it would transmit a PUCCH 1220 indicating either ACK or NACK of the PDSCH 402.1. However if the UE did not receive the PDCCH 400.1, it would not transmit PUCCH 1220 and the gNB would receive DTX when attempting to receive PUCCH 1222. Based on this DTX, the gNB schedules a re-transmission of the PDCCH 400.2 back-indicating the original PDSCH 402.1.

The following further examples provide more detailed example embodiments of the present technique. For the sake of providing a concrete example, these example embodiments are described based on the gNB not receiving PDCCH_ACK indications, but the skilled artisan will readily understand how the embodiments can be applied to any situation in which the gNB determines that the UE did not receive an original PDCCH.

DCI Contents of Re-Transmitted PDCCH

Figure 13:
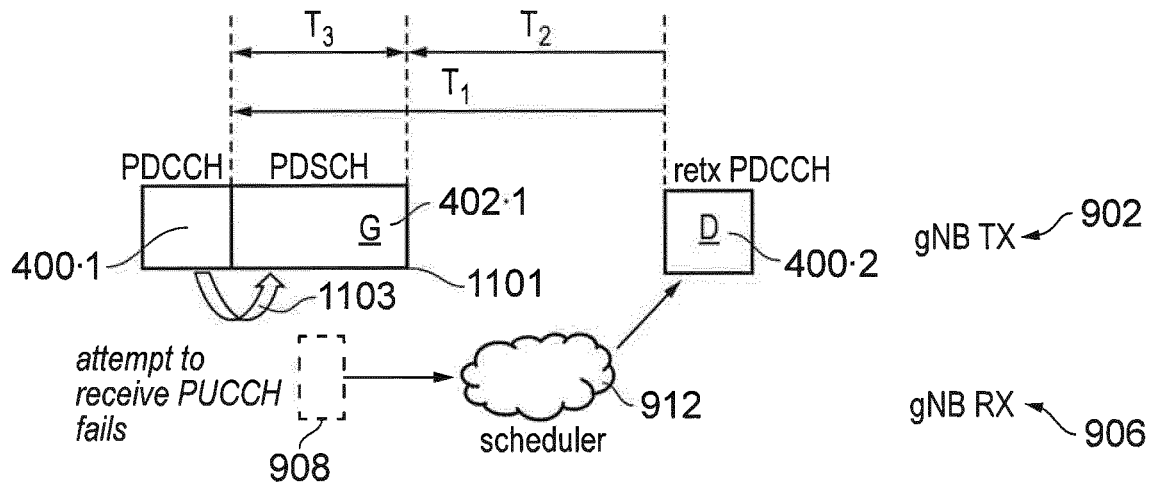
FIG. 13 is a schematic diagram illustrating the process of FIG. 11 in which the retransmitted control signal carries control information which identifies the previously transmitted data signal component of the encoded data packet stored in a buffer of a receiver in the communications device.

According to an example embodiment illustrated in FIG. 13, the downlink control information (DCI) of the re-transmitted PDCCH contains the following information:

an indication of the format of the first transmission of the encoded data packet comprising the signal components in the PDSCH 402.1 in FIG. 11. The format includes aspects such as modulation and coding scheme (MCS), allocated resources (number of physical resource blocks (PRB) allocated, redundancy version etc.).

indication of the time resources occupied by the PDSCH.

The time resources can be indicated as:

The number of OFDM symbols ago that the PDSCH transmission commenced (time $T_1$ in FIG. 13) (alternatively, the number of OFDM symbols ago that the PDSCH transmission ended (time $T_2$ in FIG. 13): the UE can determine the starting OFDM symbol if the PDSCH transmission is of a known duration (time $T_3$ in FIG. 13)).

The number of mini-slots ago that the PDSCH transmission commenced (time $T_1$ in FIG. 13).

An implicit timing relationship. The PDCCH can indicate that a PDSCH was previously transmitted to the UE and the UE can determine the timing of that previous PDSCH if there is a known timing relationship between a re-transmitted PDCCH and a back-indicated PDSCH The indication of the time resources can optionally contain an indication of the duration of the time taken to transmit the PDSCH (i.e. the time duration $T_3$). This may be particularly useful in some circumstances:

The PDSCH 402.1 may have been transmitted as an aggregated set of OFDM symbols, or an aggregated set of mini-slots. In this case, there is no predetermined duration of the aggregated PDSCH (the duration of the PDSCH depends on the degree of aggregation)

The control channel duration at the time of the original PDCCH 400.1 may have been different to the control channel duration of the re-transmitted PDCCH 1102. Since the PDSCH duration is typically calculated as the duration of a subframe minus the duration of the control channel region, the duration the original PDSCH 402.1 cannot be determined from the duration of the control channel region for the retransmitted PDCCH 1102. Hence it may be beneficial for the re-transmitted PDCCH 1102 to indicate the duration of the original PDSCH 402.1.

Note that the timing relationships described relate to a signal component of the encoded packet transmitted in the PDSCH that was not received due to an immediately previous PDCCH containing the corresponding control information not being acknowledged by the UE. It is also possible that there are multiple failures to acknowledge a PDCCH and its retransmissions. In this case, the timing relationship might relate to a PDSCH transmitted several scheduling cycles earlier, as shown in FIG. 13, in which the same or corresponding parts have the same numerical designations.

Figure 14:
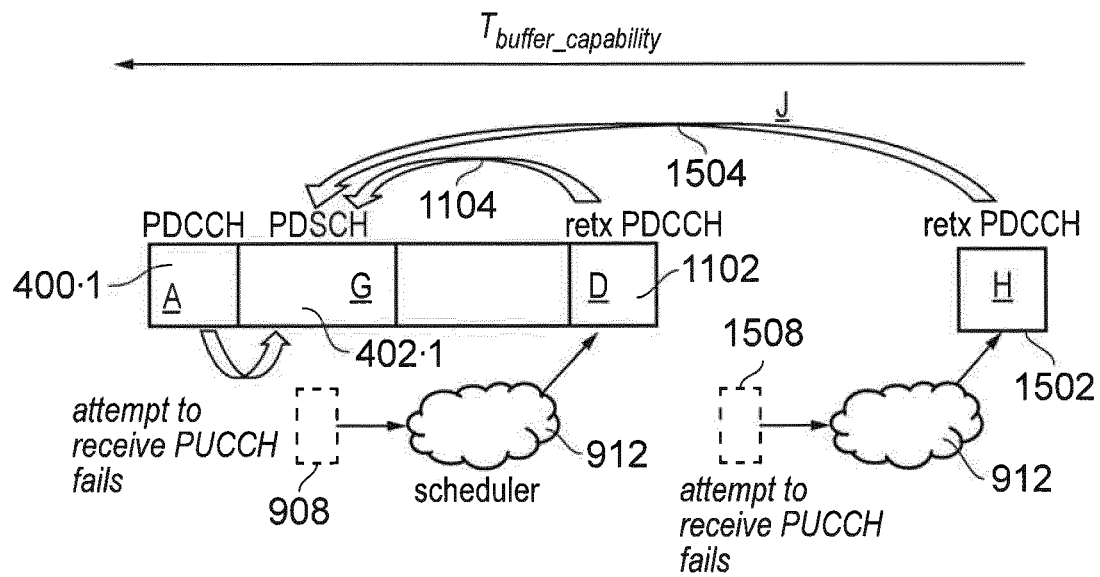
FIG. 14 is a part schematic block diagram, part flow diagram illustrating a process of transmitting a URLLC packet in accordance with an embodiment of the present technique in which a control signal of an encoded data packet, which identifies a previously transmitted data signal component of the encoded data packet stored in a buffer of a receiver in the communications device is retransmitted a plurality of times.

FIG. 14 shows a first transmission of an encoded data packet 1101 comprising the control signal component PDCCH 400.1 that is not acknowledged at the gNB in that no PDCCH_ACK is received within the window 908. The scheduler 912 in the gNB then re-transmits a control signal component in the PDCCH 1102 back-indicating the previously transmitted PDSCH 402.1 as represented by the arrow 1104. The gNB also does not receive an acknowledgement (PDCCH_ACK) for this PDCCH transmission within an expected window 1508. Hence the scheduler 912 in the gNB sends another re-transmission of the control signal component in the PDCCH 1502, which includes a back-indication 1504 to the data signal component transmitted in the PDSCH 402.1 transmitted two scheduling cycles previously.

It should be appreciated that the UE would need to buffer at least one scheduling interval even if it did not detect a PDCCH since the gNB may transmit a back indicator. Accordingly the receiver includes a buffer to store signal samples of signals received from the wireless access interface for a predetermined time period, which may be sufficient to store a number of possible transmission intervals of the PDCCH or PDSCH. In the case where the back indicator points to a scheduling interval that is several intervals ago, the UE would need to ensure that that scheduling interval is buffered. Hence, in an example embodiment, the network can configure the UE the number of scheduling intervals that a UE's receiver needs to buffer when the UE is configured to operate with a back indicator.

The UE may also send a capability message to the gNB (e.g. when the UE forms an RRC connection with the network). The capability can relate to the buffering capability of the UE (e.g. the time extent over which the UE can buffer received signals). Based on the knowledge of this buffering capability the gNB can decide whether it should simply retransmit the PDCCH or transmit a new PDCCH and a new PDSCH.

For example, referring to FIG. 14, the UE informs the gNB that it is capable of buffering received signals for a time period $T_{buffer\_capability}$. Since the original PDSCH transmission 402.1 occurs within this time period, the base station re-transmits a PDCCH 1502 back-indicating the original PDSCH 402.1.

Figure 15:
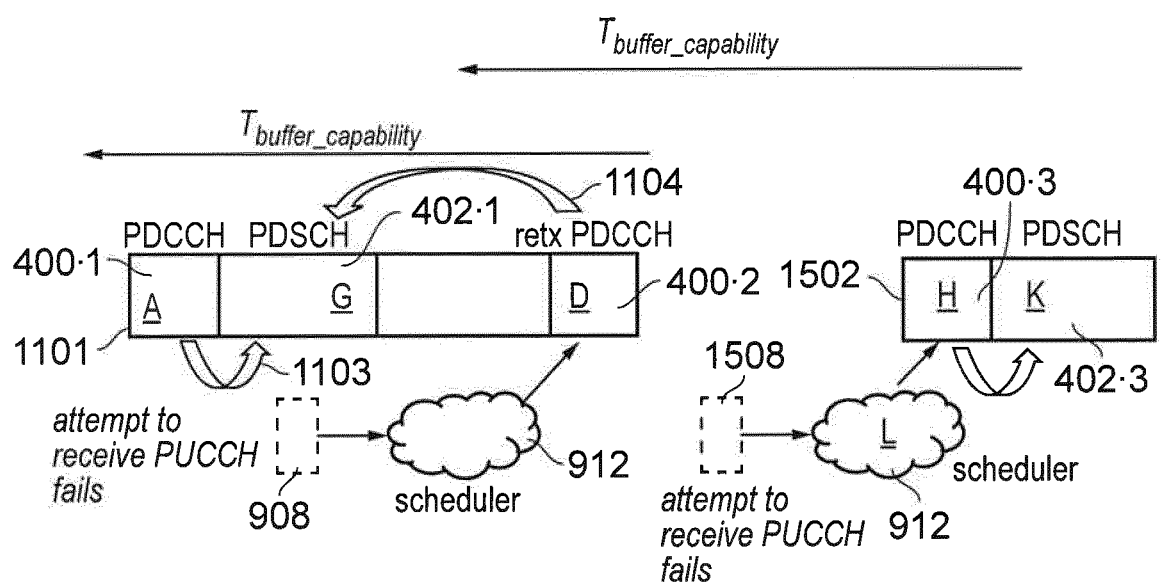
FIG. 15 is a part schematic block diagram, part flow diagram illustrating a process of transmitting a URLLC packet in accordance with an embodiment of the present technique corresponding to the example of FIG. 14 illustrating a receiver buffer capacity for storing previous transmissions.

FIG. 15 shows the case where the UE has a smaller buffering capability than that shown in FIG. 14. The first re-transmitted PDCCH 1102 is able to back indicate the PDSCH 402.1 within the buffering capability of the UE. In FIG. 15, since the re-transmitted PDCCH 1102 fails, the base station decides whether to re-schedule the PDCCH as part of the scheduler function operation 912. Since the original PSDSCH 402.1 is outside the buffering capability of the device (relative to a PDCCH 400.1), the scheduler 912 determines that it must schedule a new PDSCH 1502 using a new PDCCH 400.3.

Separate Search Space/RNTI for Re-Transmitted PDCCH

The re-transmitted control signal component PDCCH 400.2 can occupy a different search space to that used for other control, signal components transmitted in the PDCCH 400.1. i.e. the re-transmitted PDCCH can occupy a different set of physical resources, or can combine physical resources in a different manner, to the physical resources used for the initial PDCCH transmission of the PDCCH. If the UE receives a PDCCH in this separate search space, it knows that it should use the "back-indication" rules to interpret the contents of the PDCCH.

The re-transmitted PDCCH can use a different RNTI (radio network temporary identifier or radio network identifier) to that used for the initial PDCCH transmission (e.g. the UE is assigned an RNTI and uses that RNTI to attempt to decode initial PDCCH transmissions and uses "RNTI+1" to attempt to decode re-transmitted PDCCH).

The re-transmitted PDCCH can be encoded using a different frozen bit pattern to the pattern used for initial PDCCH transmissions when the PDCCH is encoded using a polar code.

Indication of Re-Transmitted PDSCH

According to another example embodiment, a UE may be configured to detect and to decode an encoded data packet from a first transmission of the encoded data packet, which comprises a control signal component transmitted in the control channel resources (PDCCH) followed by a data signal component transmitted within the shared channel resources (PDSCH) of the wireless access interface representing the encoded data packet, and a second transmission of the encoded data packet comprising a control signal component transmitted in the control channel resources (PDCCH) followed by a data signal component transmitted within the shared channel resources (PDSCH) of the wireless access interface representing the same encoded data packet. The control signal component of the second transmission includes information for detecting and/or decoding the data from the encoded data packet transmitted in the second transmission in the shared channel after the control signal providing the control channel information of the second transmission and information identifying at least a temporal location of the data signal component representing the encoded data packet received and stored in the receiver buffer in the first transmission before the control signal component of the second transmission. The UE may therefore detect the data signal of the first transmission in the receiver buffer from the temporal location provided by the control signal of the second transmission, generate an estimate of the data carried by the encoded data packet from one or both of the data signal components of the first transmission detected from the receiver buffer and data signal component representing the encoded data packet received in the second transmission of the encoded data packet. According to this example therefore the re-transmitted control signal component 400.2 in the PDCCH provides a back-indication of a previous data signal component of the encoded data packet in the PDSCH and an indication of a re-transmitted data signal component of the encoded data packet in the PDSCH. This example is illustrated in FIG. 16.

Figure 16:
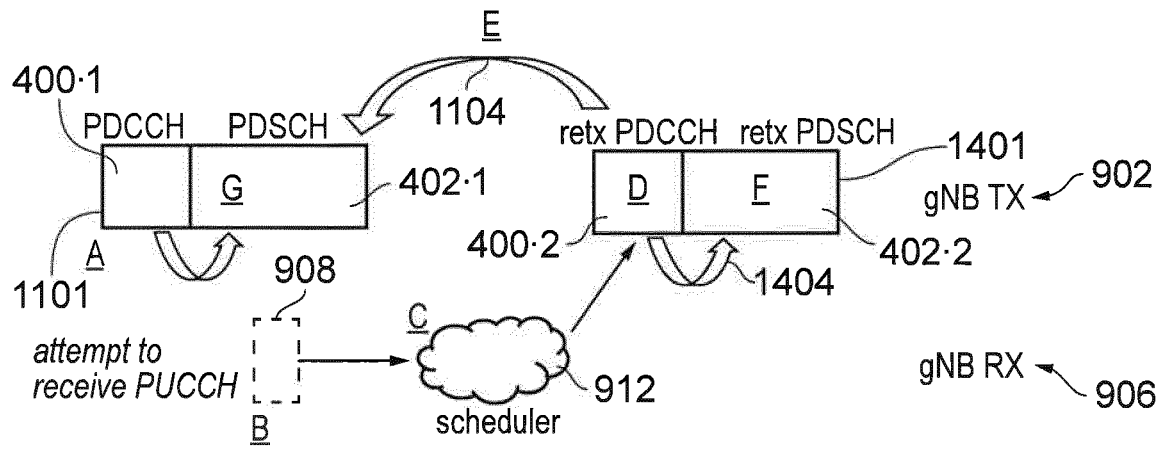
FIG. 16 is a part schematic block diagram, part flow diagram illustrating a process of transmitting a URLLC packet in accordance with an embodiment of the present technique in which the encoded data packet is re-transmitted and the re-transmitted control signal of the encoded data packet identifies a previously transmitted data signal component of the encoded data packet stored in a buffer of a receiver in the communications device and the data signal component of the retransmitted encoded data packet according to the present technique.

According to the example embodiment shown in FIG. 16, in which corresponding parts shown in other embodiments have the same reference numerals, a first transmission of an encoded data packet is shown followed by a second retransmission of the encoded data packet. FIG. 16 illustrates an example embodiment which is the similar to the example embodiment shown in FIGS. 11 to 15 and so the differences will be described for brevity. As shown in FIG. 16, a second transmission of the encoded data packet 1401 includes a re-transmission of the control signal component 400.2 in the PDCCH, which includes a back-indication of the previously transmitted data signal component 402.1 in the PDSCH as represented by an arrow 1104. However the re-transmitted control signal component 400.2 in the PDCCH also provides an indication of a re-transmission of the data signal component of the second transmission of the encoded data packet in the PDSCH 402.2 as represented by an arrow 1404. According to this example, the UE is able to combine the data signal component 402.1 in the back-indicated PDSCH and the re-transmitted data signal component 402.2 in PDSCH. For example, the combining may be performed by maximum ratio combining, or LLR combining, of the two data signal components received from the PDSCHs 402.1, 402.2.

The benefit of this example embodiment is that the reliability of the PDSCH is increased through its re-transmission. For example, in a time-varying channel, if the original PDCCH transmission 400.1 was subject to a fade, then it is likely that the original PDSCH transmission 402.1 was also subject to the fade. Hence it is beneficial to re-transmit the PDSCH 402.2 as well as to re-transmit the PDCCH 400.2.

In this example embodiment, the re-transmitted PDSCH 402.2 and the back-indicated PDSCH 402.1 can be indicated in the same DCI. For example, the DCI can indicate the format of the re-transmitted PDSCH 402.2 and can indicate:

- whether there is a back-indicated PDSCH (e.g. a single bit field)
- the relative timing of the back-indicated PDSCH (for example according to the methods described with reference to FIG. 13)
- The redundancy version of the back-indicated PDSCH. Alternatively, there can be a known relationship between the redundancy version of the back-indicated PDSCH and the re-transmitted PDSCH (e.g. the redundancy version of the back-indicated PDSCH is one less than the redundancy version of the re-transmitted PDSCH)

This example embodiment illustrated in FIG. 16 has been described with respect to a single back-indicated PDSCH 402.1. In other embodiments, more than one PDSCH can be back-indicated. For example, if a first PDCCH was not acknowledged by the UE and a second PDCCH was not acknowledged by the UE, then the back-indication can indicate PDSCH resources indicated by the first PDCCH and additionally indicate PDSCH resources indicated by the second PDCCH.

Timing of PUCCH Transmission

Figure 17:
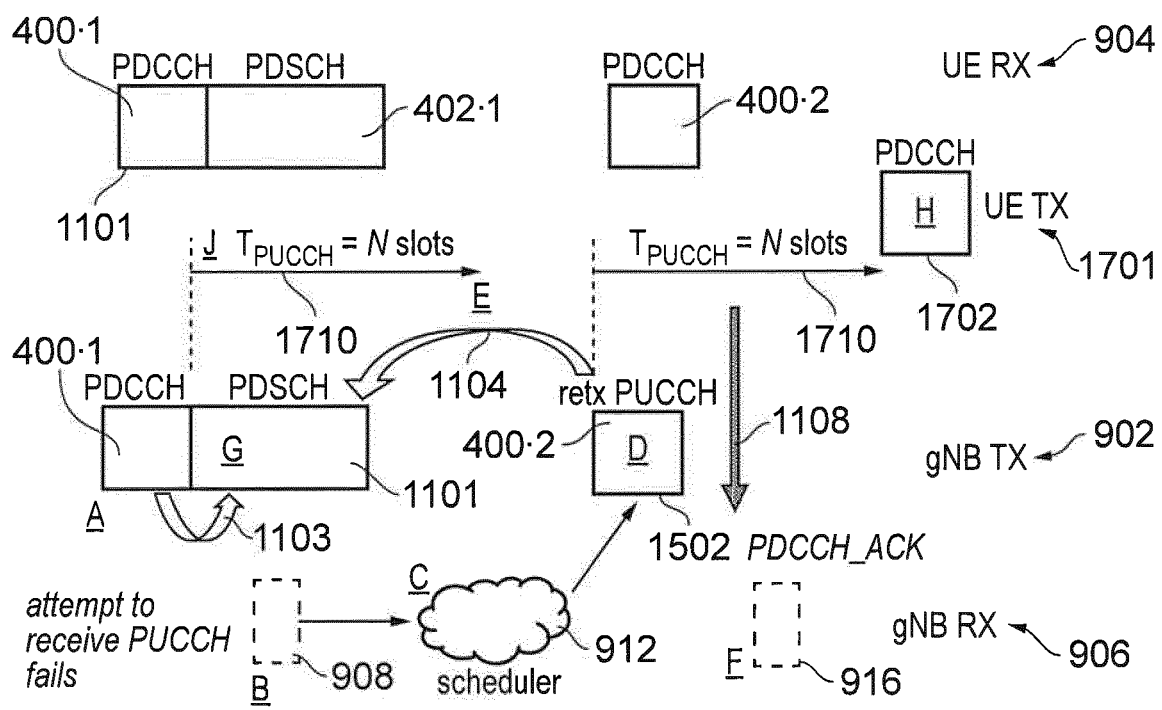
FIG. 17 is a part schematic block diagram, part flow diagram illustrating a process of transmitting a URLLC packet in accordance with an embodiment of the present technique in which the control signal allocating an encoded data packet is re-transmitted and the re-transmitted control signal of the encoded data packet identifies a previously transmitted data signal component of the encoded data packet stored in a buffer of a receiver and the timing of the acknowledgement from the communications device is re-assigned based on the re-transmitted control signal.

The timing of any ACK/NACK signals from the UE (e.g. transmitted in PUCCH) can be relative to the re-transmitted PDCCH, rather than relative to the originally transmitted PDCCH 400.1. i.e. with reference to FIG. 17, the timing of the ACK/NACK signal 1702 is relative to PDCCH 400.2, not relative to PDCCH 400.1. FIG. 17 shows that the original PDCCH 400.1 indicates to the UE that the UE should transmit PUCCH 'N' slots after the PDCCH 400.1 as represented by an arrow 1710. Since there is a PDCCH re-transmission 1502, the PUCCH 1702 is actually transmitted 'N' slots after this re-transmitted PDCCH 1502. The timing of the PUCCH 1710 can be implicit relative to the PDCCH 1501, for example based on some rule that the PUCCH 1702 is transmitted 'N' slots after PDCCH 1502 or explicit, for example a timing is indicated explicitly in the PDCCH 400.1, 400.2.

Combining PDCCH with Previous PDCCH

In some example embodiments of the present technique, a re-transmitted PDCCH can be combined with an originally transmitted PDCCH by the UE. The UE can blind decode potential combinations of a PDCCH transmitted at different times.

In some example embodiments, the bit sequence representing the downlink control information carried by the originally transmitted PDCCH and the re-transmitted PDCCH should preferably be identical to facilitate combination of the originally transmitted PDCCH and the re-transmitted PDCCH. If the bit sequences are identical, soft combining of the originally transmitted and re-transmitted PDCCHs can be performed. If the bit sequences differ, combining may still be possible, but a signal processing algorithm that is more complex than soft combining may be required.

Figure 18:
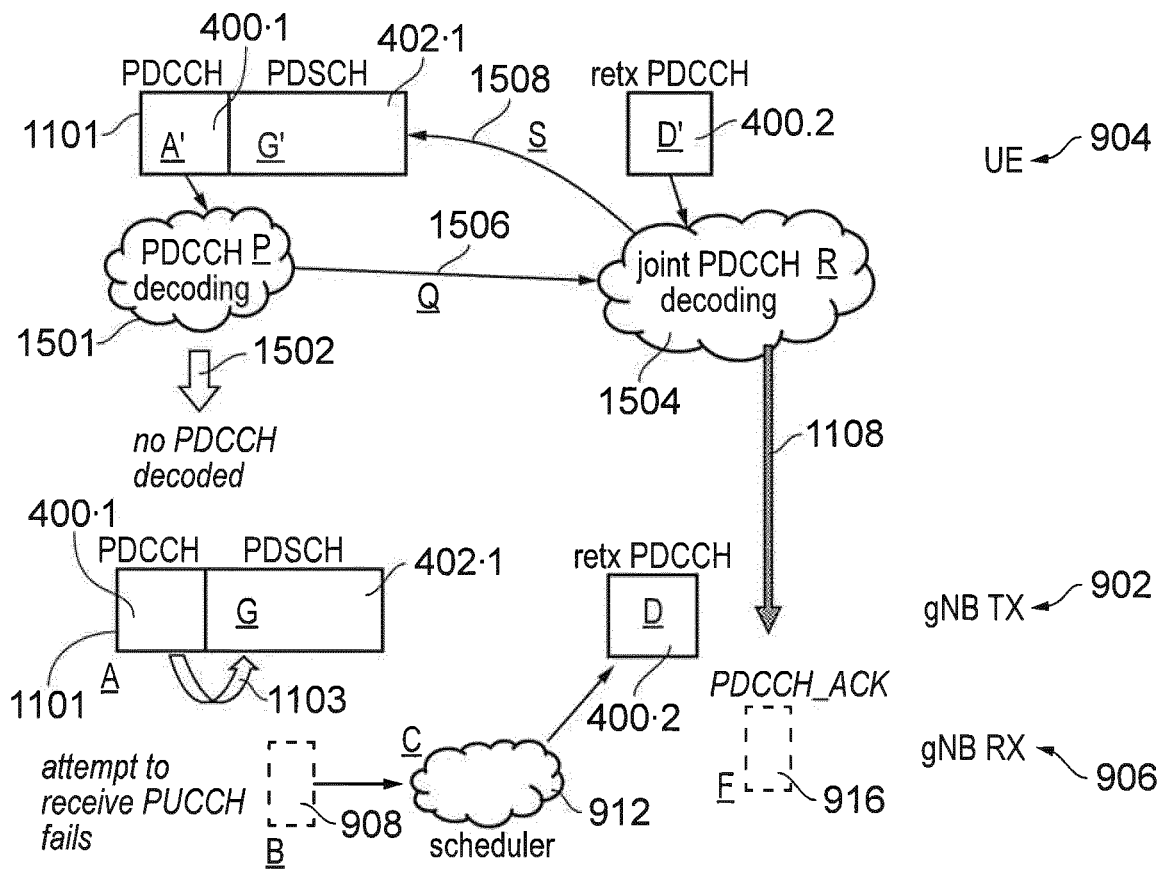
FIG. 18 is a part schematic block diagram, part flow diagram illustrating a process of transmitting a URLLC packet in accordance with an embodiment of the present technique in which a control signal of an encoded data packet is combined with the control signal component received in a retransmission of the encoded data packet, the control information detected from the combination identifying the previously transmitted data signal component of the encoded data packet stored in a buffer of a receiver in the communications device.

According to some embodiments therefore combining the control information from different transmissions of a encoded data packet can provide an advantage because a receiver is more likely to be able to detect the control information and so has the benefit of increasing the robustness of the PDCCH. Soft-combining of the candidates for a PDCCH with a candidate for a previously transmitted PDCCH increases the reliability of the combined PDCCH. Robustness is increased via one or more of three mechanisms:

- maximum ratio combining of multiple transmissions increases the effective SNR of the received PDCCH
- time diversity of the two time instances of the PDCCH
- frequency diversity of the two time instances of the PDCCH, if the originally transmitted PDCCH and the re-transmitted PDCCH are transmitted using different frequency resources An example embodiment of the present technique which combines the repeatedly transmitted control information from control signal components of the encoded data packet in the PDCCH is shown in FIG. 18. FIG. 18 includes parts which have already been described in other embodiments with reference to FIGS. 11 to 17, and in particular FIG. 11 and so only the differences will be described for brevity. According to this example embodiment the UE is configured to combine the control signal components of a repeatedly transmitted encoded data packet or combine the control information of the encoded data packet carried by the control signal components. According to this example, the UE attempts to detect and to decode the control signals received in the first transmission in the PDCCH 400.1 as represented in a process step 1501, by blind decoding multiple PDCCH candidates. If the UE does not succeed in decoding any PDCCH candidate, it does not transmit PUCCH (i.e. the UE does not send a PDCCH_ACK to the gNB) as represented by an arrow 1502. As with the other example embodiments, the gNB attempts to decode PDCCH_ACK transmitted by the UE on PUCCH in a time window 908, but fails to do so. The scheduler 912 of the gNB then re-schedules the transmission of the control signal component 400.2 in the PDCCH 1102 since it did not receive PDCCH_ACK. The gNB re-transmits the control signal component of the encoded data packet 400.2 in the PDCCH 1102 and the UE attempts to decode the received control signals received from the PDCCH 1102, but fails to do so. However, in a process step 1504 the UE performs joint PDCCH decoding of PDCCH candidates based on received samples of the control signal 400.1, 400.2 from the first transmission of the control signal component 400.1 in the first PDCCH 1101 and the second transmission of the control signal component 400.2 in the second PDCCH 1102. For example, the UE attempts to decode a particular PDCCH candidate from the second transmission with the same particular PDCCH candidate from the first transmission, using for example LLR combining on received samples from the first and second PDCCHs 1101, 1102. Alternatively, instead of using the raw received samples from first transmission in the PDCCH 1101, the receiver circuitry in the UE can use partially processed samples from the previous decoding attempt to detect the PDCCH candidate as represented by an arrow 1506. As for the other examples, once the UE has been able to detect the control signal and to decode the control information from the process step 1504, based for example on jointly decoding the PDCCH candidates, the UE transmits a PDCCH_ACK to the gNB. The UE then uses the downlink control information carried by the jointly decoded PDCCH to determine the temporal location and format of the received data signal component transmitted in the PDSCH 402.1 as represented by an arrow 1508.

Determination of PDSCH Location

When the UE decodes the re-transmitted PDCCH 400.2 in FIG. 18, there may be ambiguity about whether that is actually a re-transmitted PDCCH 400.2, which refers to a previous PDSCH 402.1 or an initial transmission of a PDSCH 402.2. This issue may be resolved in one of several ways:

A broadcast control channel, such as a broadcast PDCCH could be used (see below) in which the use of the broadcast PDCCH infers that the control information conveyed in the PDCCH is for identifying a location of a PDSCH which has already been transmitted and is therefore located in the receiver buffer.

A re-transmitted PDCCH consists of two portions:
Portion A: can be combined with a previous PDCCH transmission
Portion B: cannot be combined with a previous transmission. This portion indicates to the UE whether the PDCCH can be combined with a previous PDCCH. Note that the example of the broadcast PDCCH described below can be considered to be a non-combinable portion B that is broadcast to a group of UEs UE determines PDSCH location algorithmically, for example;
If the re-transmitted PDCCH 400.2 of FIG. 18 is successfully received without combination with another PDCCH, assume that the PDSCH follows this re-transmitted PDCCH i.e. immediately following the re-transmitted PDCCH 400.2 of FIG. 18;
If the re-transmitted PDCCH 400.2 of FIG. 18 can only be successfully decoded in combination with a previous PDCCH 400.1, the PDSCH 402.1 is assumed to be located relative to that previous PDCCH 400.1 (i.e. the PDSCH 400.1 transmitted in the first transmission of the encoded data packet in FIG. 18;
The UE can perform both of the above steps. For example, referring to FIG. 20, if the UE successfully decodes PDSCH 402.2, based on decoding the PDCCH 400.2 or decodes the PDSCH 402.1, based on joint decoding of PDCCH 400.1, 400.2, the UE sends an ACK to the base station and sends the contents of both PDSCH 402.2 and PDSCH 402.1 to the UE's upper layers. UE upper layers can then ignore any duplicate PDSCH (or MAC-PDUs) received.

As will be appreciated in some examples the aggregation level of the control signals 400.1 representing the control information in the first transmission in the PDCCH 1101 may be different to the aggregation level of the control signals 440.2 representing the control information in the second transmission in the PDCCH 1102, or they may be the same. For the example in which the aggregation levels are the same, a higher effective aggregation level is then created by combining the reception of the first and second control signals 400.1, 400.2 at the UE. However this combination requires the control information to be identical, in that the control signals received in the first transmission 400.1 carry the same information as the control signals of the second transmission 400.2.

If the control signals of the first and second transmissions 400.1, 400.2 have different aggregation levels, then the effective aggregation level is a sum of the separate aggregation levels. For example, the re-transmitted PDCCH can have an aggregation level of 8 and the original PDCCH can have an aggregation level of 4. The effective combined aggregation level is then 12. In order to jointly decode PDCCHs with different aggregation levels, the UE performs multiple decoding attempts based on different hypotheses of the aggregation levels of the first and second transmissions 1101, 1102. In order to upper bound the processing requirements of the UE (e.g. to provide a bound on the set of decoding hypotheses), in some embodiments the receiver in the UE is configured to limit possible combinations of candidates of the first PDCCH 1101 and the re-transmitted PDCCH 1102. For example the first PDCCH 1101 can have aggregation levels of {2, 4 or 8} and the re-transmitted PDCCH 1102 can have aggregation levels of {4 or 8}.

Re-Transmitted PDCCH Occupies Different Frequency Resources

The re-transmitted PDCCH can occupy different frequency resources to those used for the original PDCCH. This operation is desirable if the channel is subject to frequency selective fading: if the original PDCCH transmission failed due to fading in a certain frequency range, it is desirable to re-transmit the PDCCH in a different frequency range (that is hopefully not subject to fading). I.e. this mode of re-transmission exhibits frequency diversity.

Figure 19:
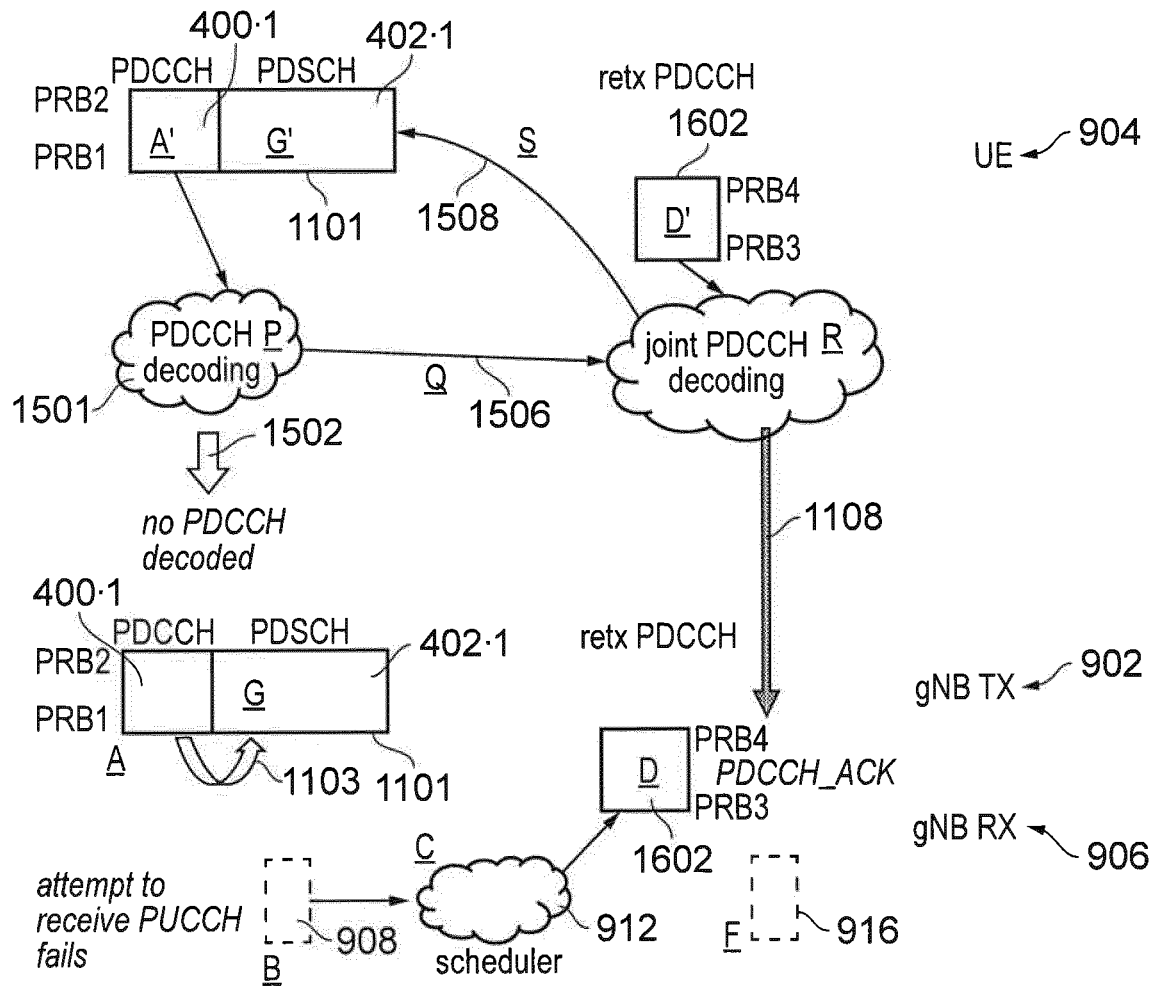
FIG. 19 is a part schematic block diagram, part flow diagram illustrating an example embodiment corresponding to that shown in FIG. 15, but adapted to retransmit the control signal component of the encoded data packet in different physical resource blocks to those of the first transmitted control signal component.

FIG. 19 provides an illustration according to this embodiment of the present technique where again those component parts which have already been described in previous examples have the same numerical designations and also will not be re-described. FIG. 19 shows the first transmission of the encoded data packet comprising the control signals 400.1 in the PDCCH 1101 being transmitted in physical resource blocks in a range of PRB1-PRB2 and the re-transmission of the control signals 400.2 in the PDCCH 1602 being transmitted in the physical resource blocks in a range PRB3 to PRB4. In the joint PDCCH decoding process 1504, the UE performs joint decoding of the PDCCH candidate that is transmitted as an initial transmission 1101 in PRB range PRB1 to PRB2 and the re-transmitted PDCCH 1602 that is transmitted in the PRB range PRB3 to PRB4.

According to some example embodiments, there would be a known number of candidate relationships between the frequency resources used for a first transmission and those used for a re-transmission (e.g. a candidate re-tx PDCCH that starts at location PRB1 would be associated with an original PDCCH transmission at frequency location PRB1+ΔPRB, where ΔPRB is a frequency offset of the re-transmitted PDCCH 1602 relative to the original PDCCH 1101). For example referring to FIG. 19, PRB3=PRB1+ΔPRB.

Combination of Re-Transmitted PDCCH and Re-Transmitted PDSCH

Figure 20:
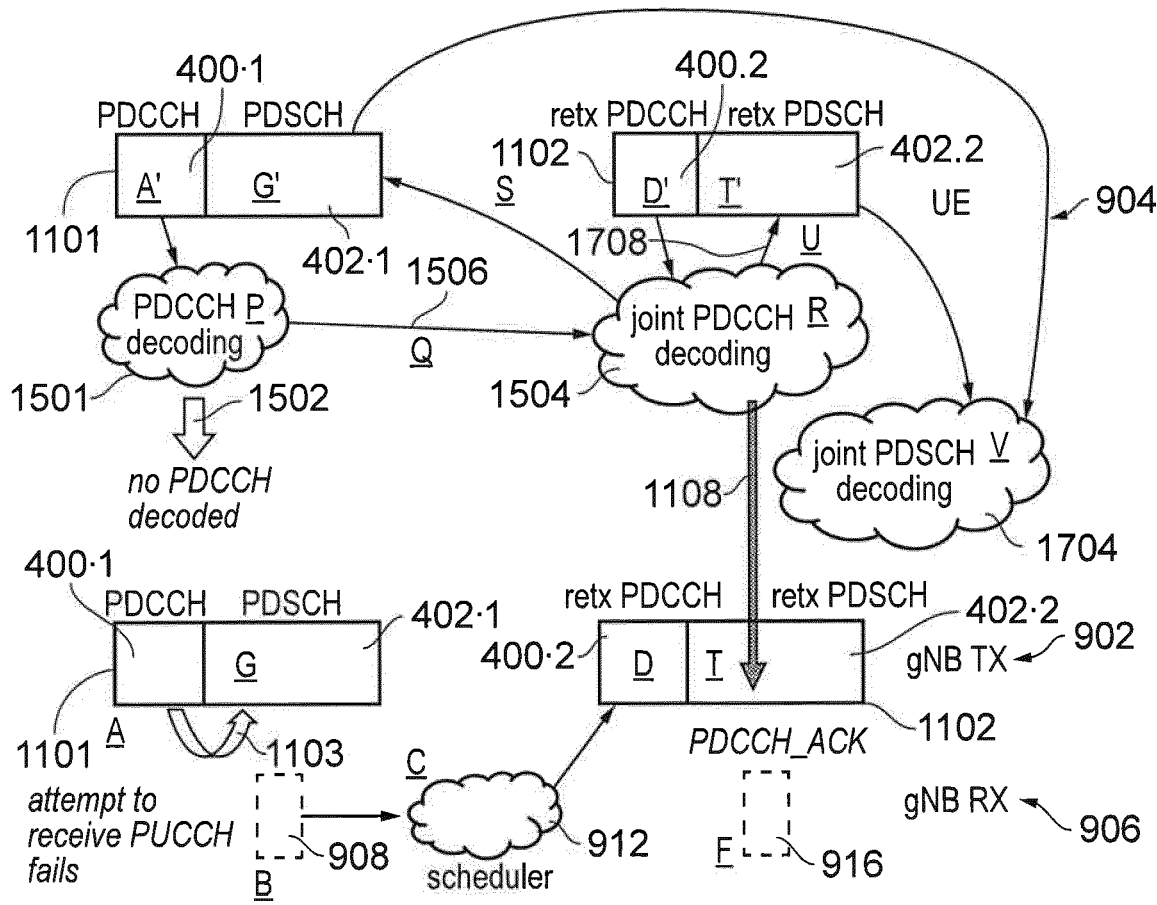
FIG. 20 is a part schematic block diagram, part flow diagram illustrating a process of transmitting a URLLC packet in accordance with an embodiment of the present technique in which a control signal of an encoded data packet is combined with the control signal component received in a retransmission of the encoded data packet, and the data signal component of the retransmitted encoded data packet transmitted.

Another example embodiment of the present technique is illustrated in FIG. 20, in which the receiver in the UE combines the data signals 402.2 of the first transmission 1101 in the PDSCH with the data signals of the second transmission 1102 in the PDSCH 402.2. As shown in FIG. 20, a re-transmission of the PDCCH 400.2, is followed by a re-transmission of the PDSCH 402.2. The UE performs joint decoding of PDCCH, based on an original PDCCH transmission 400.1 and a re-transmission of PDCCH 400.2. Once the UE has performed joint decoding of the PDCCH in the process 1504, the UE is able to infer the location of the first transmission of the PDSCH 402.1 and also infer the location of the re-transmitted received PDSCH 402.2 as represented by arrows 1508, 1708. The UE is then able to decode data signals received from the PDSCH in a process step 1704 based on both received samples from the first transmission 1101 of the data signal component in the PDSCH 402.1 and the re-transmitted data signal component in the PDSCH 402.2.

In some examples, there may be a set of rules to define the location of the re-transmitted PDSCH 402.2 relative to the first transmission of PDSCH 402.1. For example:

the re-transmitted PDSCH 402.2 occupies the same frequency resources as the original PDSCH 402.1, or the re-transmitted PDSCH 402.2 occupies frequency resources that are offset from the original PDSCH 402.1 by a known frequency offset (e.g. ΔPRB).

In some examples, there may also be a known relationship between the format of the PDSCH re-transmission 402.2 to that of the original transmission PDSCH transmission. For example The redundancy version of the re-transmitted PDSCH 402.2 has a fixed offset relative to the redundancy version used for the original transmission. For example, if the first transmission of the data signal component uses redundancy version $RV_n$, then the second transmission of the data signal component uses redundancy version $RV_n+1$ of the PDSCH. The skilled artisan will be aware that the mathematical relationships between redundancy versions can be performed module the number of redundancy versions.

The modulation and coding scheme of the re-transmitted PDSCH 402.2 has a fixed offset relative to that of the first transmission in the PDSCH. For example, if the first transmission used a QPSK rate 1/3 format, then the second transmission uses a QPSK R=1/6 format).

Broadcast PDCCH Back Indicates a Previous PDCCH Transmission

It has been proposed that 5G/NR should support a broadcast PDCCH. All UEs or a group of UEs would monitor for the broadcast PDCCH for control messages that are common to them, for example, which may provide an indication of the slot format of upcoming transmissions.

Figure 21:
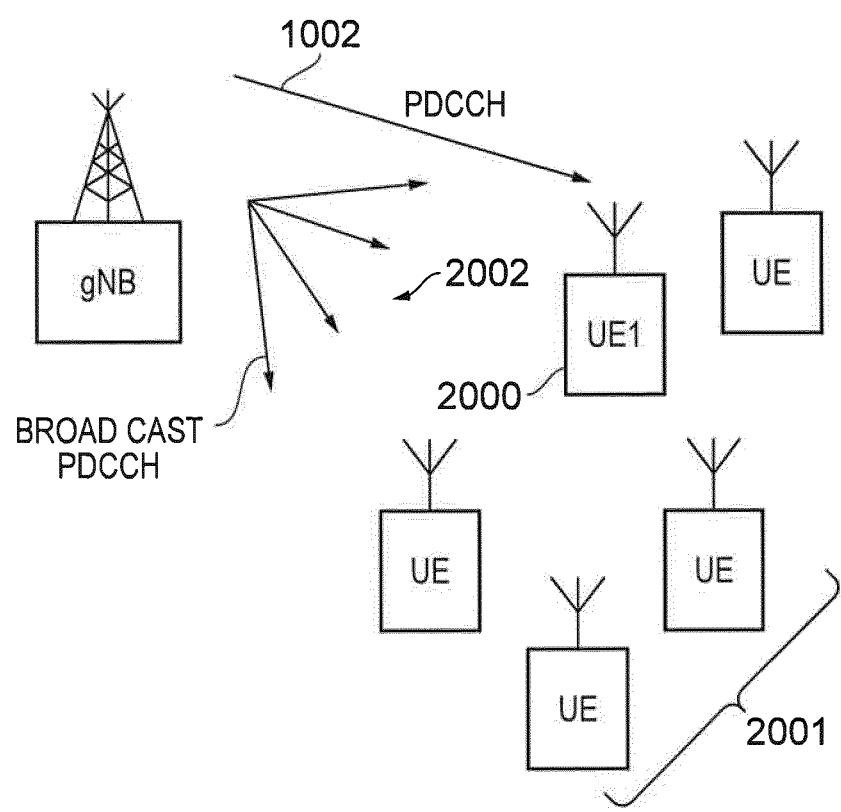
FIG. 21 is a schematic representation of an example in which a control signal component of an encoded data packet is retransmitted in a broadcast control channel to a group of communications devices according to the present technique.

According to some embodiments a back indicator is signalled in the broadcast PDCCH. This broadcast PDCCH can target a smaller group of UEs and for these UEs, in addition to detecting the PDCCH, they would also attempt to decode a previous PDCCH and to combine them using one of the methods described in the above embodiments. That is to say that the back indicator which is a part of the control information carried by the control signals transmitted in the PDCCH and indicating a location of the data signal which has already been transmitted and therefore stored in the receiver buffer is communicated in a broadcast PDCCH to a group of one or more UEs. By separating the back indicator from the DCI scheduling the grant (carried by the PDCCH), the various combining methods can be simplified, since the UE is aware that the PDCCH should be combined with a previous PDCCH, instead of blindly attempting to perform such combinations. This embodiment is illustrated by a schematic block diagram shown in FIG. 21, which corresponds in a similar way to the example shown in FIG. 18. The steps of the procedure illustrated by the example embodiment of FIG. 18 are therefore modified with respect to the embodiment shown in FIG. 21 as follows:

gNB transmits the encoded data packet a first time in the PDCCH 1101 to UE_1 2000, as represented by an arrow 1002 corresponding to the embodiment shown in FIG. 11. However as illustrated in FIG. 18, the PDCCH is not detected by the UE_1 and so UE_1 does not transmit PDCCH_ACK At the next scheduling interval, the gNB transmits a broadcast PDCCH 2002 to a group of UEs 2001, where the group includes UE_1 2000. The broadcast PDCCH 2002 indicates that a PDCCH in the current scheduling interval can be combined with a PDCCH 1002 in an earlier scheduling interval.

UE_1 2000 decodes the broadcast PDCCH 2001 and attempts to combine PDCCHs in the current scheduling interval with relevant PDCCHs in the previous scheduling interval (or even earlier scheduling intervals).

It should be appreciated that the retransmitted PDCCH in general can be divided into two parts, namely first part containing a back indicator and second part consists of DCI that can be combined with a prior DCI carried by a previous PDCCH transmission. That is the Broadcast PDCCH can be transmitted in another form.

There are other methods of indicating to a UE that there is PDCCH in a previous scheduling interval that the PDCCH in the current scheduling interval can be combined with. For example, the UE can be sent a robustly encoded 1-bit message (such as a preamble, or other signal sequence) that indicates that the PDCCH can be combined with a previously transmitted PDCCH.

Although the above mentioned example embodiments have been described with reference to a UE receiving a URLLC packet, it will be appreciated that embodiments of the present technique find application equally with the uplink as well as the downlink, so that the receiver operation described with reference to a UE can be equally applied in an infrastructure equipment of a wireless communications network. Alternatively, the present technique can be applied to a sidelink, i.e. to communication between UEs or between gNBs.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and samples of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various further aspects and features of the present invention are defined in the following numbered paragraphs:

Paragraph 1. A communications device configured to receive data from a wireless communications network, the communications device comprising receiver circuitry configured to receive signals transmitted via a wireless access interface provided by the wireless communications network, transmitter circuitry configured to transmit signals via the wireless access to the wireless communications network, and controller circuitry configured to control the transmitter circuitry and the receiver circuitry to receive the data represented as signals from the wireless access interface in accordance with an automatic repeat request, ARQ, type protocol in which the data is received as a plurality of encoded data packets, each encoded data packet being received as a radio signal comprising a control signal component transmitted in control channel resources (PDCCH) followed by a data signal component transmitted within shared channel resources (PDSCH) of the wireless access interface, the control signal component transmitted in the control channel carrying information for detecting or decoding the data from the encoded data packet transmitted in the shared channel representing the encoded data packet, wherein the receiver circuitry includes a receiver buffer which stores a predetermined temporal period of samples of received signals which includes at least one or both of the data signal component transmitted in the shared resources or the control signal component transmitted in the control channel, and the controller circuitry is configured with the receiver circuitry to receive a subsequent control signal component transmitted in the control channel resources, after the data signal component representing the encoded data packet, which includes information identifying at least a temporal location of the data signal component representing the encoded data previously transmitted in the shared channel resources and stored in the receiver buffer, and to detect and to decode the encoded data packet transmitted in the shared channel resources using the information identifying at least the temporal location of the data signal component representing the encoded data in the receiver buffer.

Paragraph 2. A communications device according to Paragraph 1, wherein the controller circuitry is configured with the receiver circuitry to receive each of a plurality of subsequent control signal components transmitted in the control channel resources, after the data signal component representing the encoded data packet, each of the plurality of subsequent control signal components including information identifying at least a temporal location of the data signal component representing the encoded data packet previously transmitted in the shared channel resources and stored in the receiver buffer, and to detect and to decode the encoded data packet transmitted in the shared channel resources using the information identifying at least the temporal location of the data signal component representing the encoded data packet in the receiver buffer using one or more of the plurality of subsequently received control signal components.

Paragraph 3. A communications device according to Paragraph 2, wherein the wireless access interface is arranged as a plurality of repeating time divided units in which the radio signals are transmitted, each time unit providing an interval in which the control signal component and the data signal component of the encoded data packet can be transmitted, and the controller circuitry is configured with the receiver circuitry to receive an indication from the wireless communications network of a number of time units for which the receiver circuitry should buffer the received radio signals, which determines a number of the plurality of subsequent control signal components which can be received and for which the control information carried by each of the subsequent control signals can provide the control information for detecting the data signal transmission of the encoded data packet.

Paragraph 4. A communications device according to any of Paragraphs 1, 2 or 3, wherein the one or more subsequently transmitted control signal components of the encoded data packet are received in different physical resources to the control signal component of a first transmission of the encoded data packet, and the control circuitry is configured in combination with the receiver circuitry to determine that the control information received in the different physical resources provides the information identifying at least the temporal location of the data signal component representing the encoded data packet previously transmitted in the shared channel resources and stored in the receiver buffer.

Paragraph 5. A communications device according to any of Paragraphs 1, 2 or 3, wherein the control circuitry is configured with the receiver circuitry to use a different radio network identifier to detect the control signal component transmitted in the first transmission of the encoded data packet from a radio network identifier which is used to detect the one or more subsequently transmitted control signal components.

Paragraph 6. A communications device according to Paragraph 1, wherein one or more of the encoded data packets is received from a first transmission of the encoded data packet comprising a control signal component transmitted in the control channel resources (PDCCH) followed by a data signal component transmitted within the shared channel resources (PDSCH) of the wireless access interface, and a second transmission of the encoded data packet comprising a control signal component transmitted in the control channel resources (PDCCH) followed by a data signal component transmitted within the shared channel resources (PDSCH) of the wireless access interface, the control signal component of the second transmission including information for detecting or decoding the data from the encoded data packet transmitted in the second transmission in the shared channel after the control signal providing the control channel information of the second transmission and information identifying at least a temporal location of the data signal component representing the encoded data packet received and stored in the receiver buffer in the first transmission before the control signal component of the second transmission, and the controller circuitry is configured with the receiver circuitry to generate an estimate of the control information of the encoded data packet by combining the control signals received in the first transmission with the control signals received in the second transmission or the control information detected from the first transmission and the control information detected from the second transmission of the encoded data packet.

Paragraph 7. A communications device according to Paragraph 1, wherein one or more of the encoded data packets is received from a first transmission of the encoded data packet comprising a control signal component transmitted in the control channel resources (PDCCH) followed by a data signal component transmitted within the shared channel resources (PDSCH) of the wireless access interface, and a second transmission of the encoded data packet comprising a control signal component transmitted in the control channel resources (PDCCH) followed by a data signal component transmitted within the shared channel resources (PDSCH) of the wireless access interface, the control signal component of the second transmission including information for detecting or decoding the data from the encoded data packet transmitted in the second transmission in the shared channel after the control signal providing the control channel information of the second transmission and information identifying at least a temporal location of the data signal component representing the encoded data packet received and stored in the receiver buffer in the first transmission before the control signal component of the second transmission, and the controller circuitry is configured with the receiver circuitry to detect the data signal of the first transmission in the receiver buffer from the temporal location provided by the control signal of the second transmission, and to generate an estimate of the data carried by the encoded data packet from one or both of the data signal component of the first transmission detected from the receiver buffer and data signal component representing the encoded data packet received in the second transmission of the encoded data packet.

Paragraph 8. A communications device according to Paragraph 7, wherein the controller circuitry is configured with the receiver circuitry to generate the estimate of the data carried by the encoded data packet by combining the data signal received in the first transmission and the data signal received in the second transmission, and decoding the encoded data packet based on the combined data signals received in the first and the second transmissions.

Paragraph 9. A communications device according to any of Paragraphs 1 to 8, wherein the controller circuitry is configured in combination with the transmitter circuitry and the receiver circuitry to receive the second transmission of the encoded data packet after the transmitter circuitry has transmitted a feedback signal indicating that the receiver circuitry did not detect the data from the encoded data packet after the first transmission of the encoded data packet or after a feedback signal indicating that the receiver circuitry did detect the data from the encoded data packet after the first transmission of the encoded data packet was not transmitted.

Paragraph 10. A communications device according to any of Paragraphs 1 to 9, wherein the subsequent transmission of the control signal component of the encoded data packet is received in at least two parts, where the $1^{st}$ part contains the control information indicating that the control information transmitted should be combined with the control information detected from the first transmission of the control signal component and the second part contains the control information Paragraph 11. A communications device according to any of Paragraphs 1 to 9, wherein the retransmitted control signal component is received in control channel resources which have been transmitted to at least one other communications device as a broadcast control channel Paragraph 13. An infrastructure equipment forming part of a wireless communications network for transmitting data to a communications device, the infrastructure equipment comprising receiver circuitry configured to receive signals transmitted from the communications device via a wireless access interface provided by the infrastructure equipment, transmitter circuitry configured to transmit signals to the communications device via the wireless access to the infrastructure equipment, and controller circuitry configured to control the transmitter circuitry and the receiver circuitry to transmit the data represented as signals via the wireless access interface to the communications device in accordance with an automatic repeat request, ARQ, type protocol in which the data is transmitted as a plurality of encoded data packets, each encoded data packet being transmitted as a radio signal comprising a control signal component transmitted in control channel resources (PDCCH) followed by a data signal component transmitted within shared channel resources (PDSCH) of the wireless access interface, the control signal component transmitted in the control channel carrying information for detecting or decoding the data from the encoded data packet transmitted in the shared channel representing the encoded data packet, wherein the controller circuitry is configured with the transmitter circuitry and the receiver circuitry to determine that the control signal component of an encoded data packet was not received by the communications device, and for the encoded data packet which has been determined as not having been received, to transmit a subsequent control signal component in the control channel resources, after the data signal component representing the encoded data packet, which includes information identifying at least a temporal location of the encoded data previously transmitted in the shared channel.

Paragraph 14. An infrastructure equipment according to Paragraph 13, wherein the controller circuitry is configured with the receiver circuitry to determine that the control signal component of an encoded data packet was not received by the communications device, by attempting to detect an acknowledgement signal, which would have been transmitted, in a predetermined temporal location of the wireless access interval representing an indication that the communications device successfully received the control information carried by the control signals and if the acknowledgement signal cannot be detected, determining that the control signal component of the encoded data packet was not received by the communications device.

Paragraph 15. An infrastructure equipment according to Paragraph 13, wherein the controller circuitry is configured with the receiver circuitry to determine that an encoded data packet was not received by the communications device, by attempting to detect an acknowledgement signal, which would have been transmitted, in a predetermined temporal location of the wireless access interval representing an indication that the communications device successfully received and decoded the data carried by the encoded data packet and if the acknowledgement signal cannot be detected, determining that the control signal component of the encoded data packet was not received by the communications device.

Paragraph 16. A method of receiving data at a communications device from a wireless communications network, the method comprising receiving the data represented as signals from the wireless access interface in accordance with an automatic repeat request, ARQ, type protocol in which the data is transmitted to the communications device as a plurality of encoded data packets, each encoded data packet being transmitted as a radio signal comprising a control signal component in control channel resources (PDCCH) followed by a data signal component transmitted within shared channel resources (PDSCH) of the wireless access interface, the control signal component transmitted in the control channel carrying information for detecting or decoding the data from the encoded data packet transmitted in the shared channel representing the encoded data packet, storing, in a receiver buffer, a predetermined temporal period of samples of received signals which includes at least one or both of the data signal component transmitted in the shared resources or the control signal component transmitted in the control channel, receiving a subsequent control signal component transmitted in the control channel resources, after the data signal component representing the encoded data packet, which includes information identifying at least a temporal location of the data signal component representing the encoded data packet previously transmitted in the shared channel resources and stored in the receiver buffer, and detecting and decoding the encoded data packet transmitted in the shared channel resources using the information identifying at least the temporal location of the data signal component representing the encoded data packet in the receiver buffer.

REFERENCES

[1] Holma H. and Toskala A [1] ISBN 9780470-319338 Fourth edition, 2007 Chapter 5
[2] EN 302 755 v1.3.1, 'Framing structure, channel coding and modulation for a second generation digital terrestrial television broadcasting system (DVB-T2)', ETSI, April 2012.
[3] RP-160671, "New SID Proposal: Study on New Radio Access Technology," NTT DOCOMO, RAN #71
[4] European patent application 17150730.4
Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

The invention claimed is:

1. A communications device configured to receive data from a wireless communications network, the communications device comprising:
    receiver circuitry configured to receive signals transmitted via a wireless access interface provided by the wireless communications network,
    transmitter circuitry configured to transmit signals via the wireless access to the wireless communications network, and
    controller circuitry configured to control the transmitter circuitry and the receiver circuitry:
        to receive the data represented as signals from the wireless access interface in accordance with an automatic repeat request, ARQ, type protocol in which the data is received as a plurality of encoded data packets, each encoded data packet being received as a radio signal comprising a control signal component transmitted in resources of a control channel followed by a data signal component transmitted within shared channel resources of the wireless access interface, the control signal component transmitted in the control channel carrying information for detecting or decoding the data from the encoded data packet transmitted in the shared channel representing the encoded data packet, wherein the receiver circuitry includes a receiver buffer which stores a predetermined temporal period of samples of received signals which includes at least one or both of the data signal component transmitted in the shared channel resources or the control signal component transmitted in the resources of the control channel, and the controller circuitry is configured with the receiver circuitry;
        to receive a subsequent control signal component transmitted in subsequent resources of the control channel, after a first transmission of an encoded data packet comprising a control signal component and a data signal component representing the encoded data packet, the subsequent control signal component comprises information identifying at least a temporal location of the data signal component representing the encoded data previously transmitted in the shared channel resources and stored in the receiver buffer; and
        to detect and to decode the encoded data packet transmitted in the shared channel resources using the information identifying at least the temporal location of the data signal component representing the encoded data in the receiver buffer.

2. The communications device as in claim 1, wherein the wireless access interface is arranged as a plurality of repeating time divided units in which the radio signals are transmitted, each time unit providing an interval in which the control signal component and the data signal component of the encoded data packet can be transmitted, and the controller circuitry is configured with the receiver circuitry to receive an indication from the wireless communications network of a number of time units for which the receiver circuitry should buffer the received radio signals, which determines a number of the plurality of subsequent control signal components which can be received and for which the control information carried by each of the subsequent control signals can provide the control information for detecting the data signal transmission of the encoded data packet.

3. The communications device as in claim 1, wherein the one or more subsequently transmitted control signal components of the encoded data packet are received in different physical resources to the control signal component of a first transmission of the encoded data packet, and the control circuitry is configured in combination with the receiver circuitry to determine that the control information received in the different physical resources provides the information identifying at least the temporal location of the data signal component representing the encoded data packet previously transmitted in the shared channel resources and stored in the receiver buffer.

4. The communications device as in claim 1, wherein the control circuitry is configured with the receiver circuitry to use a different radio network identifier to detect the control signal component transmitted in the first transmission of the encoded data packet from a radio network identifier which is used to detect the one or more subsequently transmitted control signal components.

5. The communications device as in claim 1, wherein the controller circuitry is configured with the receiver circuitry to determine, based on the subsequent control signal component transmitted in the subsequent resources of the control channel, that the subsequent control signal component provides the information identifying at least the temporal location of the data signal component representing the encoded data packet previously transmitted in the shared channel resources and stored in the receiver buffer.

6. The communications device as in claim 5, wherein the controller circuitry is configured with the receiver circuitry
    to generate the estimate of the data carried by the encoded data packet by combining the data signal received in the first transmission and the data signal received in the second transmission, and decoding the encoded data packet based on the combined data signals received in the first and the second transmissions.

7. The communications device as in claim 1, wherein the controller circuitry is configured in combination with the transmitter circuitry and the receiver circuitry
    to receive the second transmission of the encoded data packet after the transmitter circuitry has transmitted a feedback signal indicating that the receiver circuitry did not detect the data from the encoded data packet after the first transmission of the encoded data packet or after a feedback signal indicating that the receiver circuitry did detect the data from the encoded data packet after the first transmission of the encoded data packet was not transmitted.

8. The communications device as in claim 1, wherein the subsequent transmission of the control signal component of the encoded data packet is received in a first part that comprises control information indicating that the control information transmitted should be combined with the control information detected from the first transmission of the control signal component.

9. An infrastructure equipment forming part of a wireless communications network for transmitting data to a communications device, the infrastructure equipment comprising:

receiver circuitry configured to receive signals transmitted from the communications device via a wireless access interface provided by the infrastructure equipment, transmitter circuitry configured to transmit signals to the communications device via the wireless access to the infrastructure equipment, and controller circuitry configured to control the transmitter circuitry and the receiver circuitry:
- to transmit the data represented as signals via the wireless access interface to the communications device in accordance with an automatic repeat request, ARQ, type protocol in which the data is transmitted as a plurality of encoded data packets, each encoded data packet being transmitted as a radio signal comprising a control signal component transmitted in resources of a control channel followed by a data signal component transmitted within shared channel resources of the wireless access interface, the control signal component transmitted in the control channel carrying information for detecting or decoding the data from the encoded data packet transmitted in the shared channel representing the encoded data packet, wherein the controller circuitry is configured with the transmitter circuitry and the receiver circuitry;
- to determine that the control signal component of an encoded data packet was not received by the communications device; and
- for the encoded data packet which has been determined as not having been received, to transmit a subsequent control signal component in the resources of the control channel, after a first transmission of an encoded data packet comprising a control signal component and a data signal component representing the encoded data packet, the subsequent control signal component comprises information identifying at least a temporal location of the encoded data previously transmitted in the shared channel resources.

10. The infrastructure equipment as in claim 9, wherein the controller circuitry is configured with the receiver circuitry
to determine that the control signal component of an encoded data packet was not received by the communications device, by attempting to detect an acknowledgement signal, which would have been transmitted, in a predetermined temporal location of the wireless access interval representing an indication that the communications device successfully received the control information carried by the control signals and if the acknowledgement signal cannot be detected, determining that the control signal component of the encoded data packet was not received by the communications device.

11. The infrastructure equipment as in claim 9, wherein the controller circuitry is configured with the receiver circuitry
to determine that an encoded data packet was not received by the communications device, by attempting to detect an acknowledgement signal, which would have been transmitted, in a predetermined temporal location of the wireless access interval representing an indication that the communications device successfully received and decoded the data carried by the encoded data packet and if the acknowledgement signal cannot be detected, determining that the control signal component of the encoded data packet was not received by the communications device.

12. A method of receiving data at a communications device from a wireless communications network, the method comprising:
- receiving the data represented as signals from the wireless access interface in accordance with an automatic repeat request, ARQ, type protocol in which the data is transmitted to the communications device as a plurality of encoded data packets, each encoded data packet being transmitted as a radio signal comprising a control signal component in resources of a control channel followed by a data signal component transmitted within shared channel resources of the wireless access interface, the control signal component transmitted in the control channel carrying information for detecting or decoding the data from the encoded data packet transmitted in the shared channel representing the encoded data packet;
- storing, in a receiver buffer, a predetermined temporal period of samples of received signals which includes at least one or both of the data signal component transmitted in the shared channel resources or the control signal component transmitted in the resources of the control channel;
- receiving a subsequent control signal component transmitted in subsequent resources of the control channel resources, after a first transmission of an encoded data packet comprising a control signal component and a data signal component representing the encoded data packet, the subsequent control signal component comprises information identifying at least a temporal location of the data signal component representing the encoded data packet previously transmitted in the shared channel resources and stored in the receiver buffer; and
- detecting and decoding the encoded data packet transmitted in the shared channel resources using the information identifying at least the temporal location of the data signal component representing the encoded data packet in the receiver buffer.

* * * * *